(12) United States Patent
Xie et al.

(10) Patent No.: US 12,021,795 B2
(45) Date of Patent: Jun. 25, 2024

(54) COMMUNICATION METHOD AND NETWORK DEVICE

(71) Applicant: HUAWEI TECHNOLOGIES CO., LTD., Guangdong (CN)

(72) Inventors: Xinqian Xie, Beijing (CN); Zhiheng Guo, Beijing (CN); Wei Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/471,948

(22) Filed: Sep. 10, 2021

(65) Prior Publication Data

US 2021/0409186 A1    Dec. 30, 2021

Related U.S. Application Data

(63) Continuation of application No. 16/522,105, filed on Jul. 25, 2019, now Pat. No. 11,121,848, which is a (Continued)

(30) Foreign Application Priority Data

Jan. 25, 2017    (CN) .......................... 201710061362.5

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04W 72/0446* (2013.01); *H04W 72/23* (2023.01)

(58) Field of Classification Search
CPC ....... H04L 5/10; H04L 5/0051; H04L 5/0016; H04L 5/0094; H04L 5/0037;
(Continued)

(56) References Cited

U.S. PATENT DOCUMENTS 9,801,166 B2 * 10/2017 Harrison ............... H04L 5/0094
10,057,896 B2 * 8/2018 Blankenship .......... H04W 4/70
(Continued)

FOREIGN PATENT DOCUMENTS

CN    102076076 A    5/2011
CN    102082595 A    6/2011
(Continued)

OTHER PUBLICATIONS

NTT Docomo, Inc., "Views on DMRS", 3GPP TSG RAN WG1 NR Ad-Hoc Meeting, R1-1700606, Spokane, USA Jan. 16-20, 2017, total 8 pages.
(Continued)

*Primary Examiner* — Ajit Patel
*Assistant Examiner* — Wilfred Thomas
(74) *Attorney, Agent, or Firm* — HUAWEI TECHNOLOGIES CO., LTD.

(57) ABSTRACT

Embodiments of this application provide a communication method and a network device. The method includes: determining, by a network device, that a resource corresponding to at least one DMRS port of a plurality of DMRS ports of the network device is not used to transmit a DMRS in a first time segment; determining, by the network device, a first resource used to carry, in the first time segment, first data information to be sent to a terminal device, where the first resource includes the resource that is corresponding to the at least one DMRS port and that is not used to transmit the DMRS; sending, by the network device, indication information of the first resource to the terminal device; determining, by the terminal device based on the received indication information of the first resource, the first resource used to carry the first data information in the first time segment.

12 Claims, 8 Drawing Sheets

Related U.S. Application Data continuation of application No. PCT/CN2018/074078, filed on Jan. 25, 2018.

(51) Int. Cl.
*H04W 72/0446* (2023.01)
*H04W 72/23* (2023.01)

(58) Field of Classification Search
CPC ............ H04L 5/0078; H04W 72/0446; H04W 72/23; H04W 28/02; H04W 28/0205; H04W 28/16; H04W 72/53
See application file for complete search history.

(56) References Cited

U.S. PATENT DOCUMENTS

| | | |
|---|---|---|
| 2011/0194536 A1 | 8/2011 | Kim et al. |
| 2012/0307768 A1 | 12/2012 | Xu et al. |
| 2013/0022087 A1 | 1/2013 | Chen et al. |
| 2013/0170376 A1 | 7/2013 | Dinan |
| 2013/0242882 A1 | 9/2013 | Blankenship et al. |
| 2013/0265955 A1* | 10/2013 | Kim ................ H04W 72/04 370/329 |
| 2014/0092827 A1 | 4/2014 | Jongren et al. |
| 2014/0146765 A1 | 5/2014 | Ji et al. |
| 2014/0233407 A1 | 8/2014 | Pourahmadi et al. |
| 2014/0233466 A1 | 8/2014 | Pourahmadi et al. |
| 2015/0092722 A1 | 4/2015 | Zhang et al. |
| 2015/0092729 A1* | 4/2015 | Shan ................ H04L 5/0048 370/329 |
| 2015/0215908 A1 | 7/2015 | Seo et al. |
| 2015/0327247 A1 | 11/2015 | Chen et al. |
| 2015/0381395 A1 | 12/2015 | Guo et al. |
| 2016/0036542 A1* | 2/2016 | Gong ................ H04W 24/10 370/329 |
| 2016/0270072 A1* | 9/2016 | Andgart ............ H04W 72/0446 |
| 2017/0041906 A1* | 2/2017 | Tsai ................ H04W 52/262 |
| 2017/0279502 A1 | 9/2017 | Kim et al. |
| 2018/0227885 A1* | 8/2018 | Lee ................ H04L 5/001 |
| 2019/0074883 A1 | 3/2019 | Park et al. |
| 2019/0104006 A1 | 4/2019 | Wang et al. |
| 2019/0349181 A1 | 11/2019 | Xie et al. |
| 2020/0266963 A1 | 8/2020 | Song et al. |
| 2020/0296673 A1 | 9/2020 | Ouchi et al. |

FOREIGN PATENT DOCUMENTS

| | | | | |
|---|---|---|---|---|
| CN | 102149082 A | | 8/2011 | |
| CN | 104105120 A | | 10/2014 | |
| CN | 107046459 A | * | 8/2017 | ......... H04L 27/0014 |
| CN | 103843433 B | * | 12/2017 | ......... H04L 25/0202 |
| EP | 2639994 A2 | | 9/2013 | |
| JP | 2015518318 A | | 6/2015 | |
| JP | 2017005767 A | | 1/2017 | |
| WO | 2014113971 A1 | | 7/2014 | |
| WO | 2014142122 A1 | | 9/2014 | |

OTHER PUBLICATIONS

Huawei Hisilicon: "DL DM-RS for data transmissions", 3GPP Draft; R1-1611244, Nov. 13, 2016, total 5 pages.
Huawei Hisilicon: "Signalling design for reserved resource indication", 3GPP Draft; R1-1611206, Nov. 13, 2016, total 3 pages.

* cited by examiner

COMMUNICATION METHOD AND NETWORK DEVICE

CROSS-REFERENCE TO RELATED APPLICATIONS

This application is a continuation of U.S. patent application Ser. No. 16/522,105, filed on Jul. 25, 2019, now U.S. Pat. No. 11,121,848. which is a continuation of International Application No. PCT/CN2018/074078, filed on Jan. 25, 2018, The International Application claims priority to Chinese Patent Application No. 201710061362.5, filed on Jan. 25, 2017. All of the afore-mentioned patent applications are hereby incorporated by reference in their entireties

TECHNICAL FIELD

Embodiments of this application relate to the field of communications technologies, and in particular, to a communication method and a network device.

BACKGROUND

In a conventional wireless communications system, a network device may be equipped with a plurality of antennas to implement spatial multiplexing transmission by using a multi-input multi-output (multi-input multi-output, MIMO) technology. In other words, a plurality of data streams are transmitted on one time-frequency resource, each data stream is transmitted on an independent spatial layer, and each spatial layer is mapped to a different antenna port for transmission. Because channels from different antenna ports to a terminal device have different statuses, the network device needs to configure a demodulation reference signal (demodulation reference signal, DMRS) for each antenna port respectively and send the DMRS to the terminal device. The terminal device estimates a radio channel between the network device and the terminal device by using the received DMRS, to obtain channel state information, and then correctly obtains, by using the channel state information, information sent by the network device on a plurality of spatial layers.

A time division multiplexing mode, a frequency division multiplexing mode, a code division multiplexing mode, and the like may be usually used between DMRSs corresponding to different antenna ports. In the conventional wireless communications system, a fixed time-frequency resource element (resource element, RE) is configured for each antenna port for DMRS transmission. For example, if N (N is a positive integer) DMRS ports are defined in the system, the network device may support transmission on a maximum of N spatial layers. However, the network device does not need to schedule all the N spatial layers in some time segments due to irregular distribution of services in the system. In this case, the network device needs to allocate a corresponding DMRS port to only a scheduled spatial layer. As a result, some of the N DMRS ports defined in the system are not used. In the prior art, a code division multiplexing mode is mainly used between DMRSs. Power of an unused DMRS port is used for a scheduled DMRS port to enhance channel estimation performance. In a future new radio communications system, time division multiplexing or frequency division multiplexing is mainly used between DMRSs. If the prior-art solution is directly used, an RE corresponding to an unused DMRS port is neither used to send a DMRS nor used to send data information.

In conclusion, when a quantity of spatial layers scheduled by the network device is less than a maximum quantity of spatial layers that can be supported by the network device, one or more DMRS ports are not used, and REs corresponding to these DMRS ports are neither used to transmit a DMRS nor used to carry data information. This causes a waste of communication resources and reduces spectrum efficiency of a system.

SUMMARY

This application provides a communication method and a network device, to resolve a problem of a waste of communication resources in a wireless communications system and low spectrum efficiency of the system.

According to a first aspect, this application provides a communication method, including:
  determining, by a network device, that a resource corresponding to at least one demodulation reference signal DMRS port of a plurality of DMRS ports of the network device is not used to transmit a DMRS in a first time segment, where the at least one DMRS port includes a first DMRS port;
  determining, by the network device, a first resource used to carry, in the first time segment, first data information to be sent to a terminal device, where the first resource includes a resource corresponding to the first DMRS port;
  sending, by the network device, indication information of the first resource to the terminal device; and
  sending, by the network device, the first data information to the terminal device by using the first resource to carry the first data information.

In this embodiment, the network device determines the resource that is corresponding to the DMRS port and that is not used to transmit the DMRS; determines the first resource used to carry the first data information, where the first resource includes the resource that is corresponding to the at least one DMRS port of the plurality of DMRS ports of the network device and that is not used to transmit the DMRS; and sends the indication information of the first resource to the terminal device. In this way, the network device may transmit data information by using the idle resource. This avoids a waste of communication resources and improves spectrum efficiency of a system.

In an embodiment of the first aspect, the method further includes:
  determining, by the network device, a second resource used to carry, in a second time segment, second data information to be sent to the terminal device, where the second resource includes none of resources corresponding to all DMRS ports of the network device;
  sending, by the network device, indication information of the second resource to the terminal device; and
  sending, by the network device, the second data information to the terminal device by using the second resource to carry the second data information.

In this embodiment, when none of the resources corresponding to all the DMRS ports of the network device can be used to carry the second data information, the network device determines the second resource used to carry the second data information, where the second resource includes none of the resources corresponding to all the DMRS ports of the network device; and notifies the terminal device of the indication information of the second resource. In this way, the network device selects a proper second resource to carry the second data information, and then sends the second data information to the terminal device. Information transmission between the network device and the terminal device is implemented.

According to a second aspect, this application provides a communication method, including:

receiving, by a terminal device, indication information of a first resource from a network device;

determining, by the terminal device based on the indication information of the first resource, the first resource that is used by the network device to carry first data information in a first time segment, where the first resource includes a resource corresponding to a first DMRS port, the first DMRS port is one of at least one DMRS port of a plurality of DMRS ports of the network device, and a resource corresponding to the at least one DMRS port is not used to transmit a DMRS; and receiving, by the terminal device from the network device, the first data information carried on the first resource.

In this embodiment, the terminal device receives the indication information of the first resource from the network device; and determines, based on the indication information of the first resource, the first resource used to carry the first data information in the first time segment, where the first resource includes the resource that is corresponding to the at least one DMRS port of the network device and that is not used to transmit the DMRS. Therefore, the terminal device may correspondingly receive, from the network device, the first data information carried on the first resource. In this way, the terminal device and the network device transmit information by using the resource that is corresponding to the DMRS port of the network device and that is not used to transmit the DMRS to carry the first data information. This avoids a waste of communication resources and improves spectrum efficiency of a system.

In an embodiment of the second aspect, the method further includes:

receiving, by the terminal device, indication information of a second resource from the network device;

determining, by the terminal device based on the indication information of the second resource, the second resource that is used by the network device to carry second data information in a second time segment, where the second resource includes none of resources corresponding to all DMRS ports of the network device; and receiving, by the terminal device from the network device, the second data information carried on the second resource.

The terminal device determines, based on the indication information of the second resource that is received from the network device, the second resource used to carry the second data information in the second time segment, where the second resource includes none of resources corresponding to all the DMRS ports of the network device. In this case, the terminal device may receive, from the network device, the second data information carried on the second resource. Information transmission between the network device and the terminal device can also be implemented.

According to a third aspect, this application provides a communication method, including:

determining, by a network device, that a resource corresponding to at least one demodulation reference signal DMRS port of a plurality of DMRS ports of the network device is not used to transmit a DMRS in a first time segment, where the at least one DMRS port includes a first DMRS port;

determining, by the network device, a first resource used to carry first data information in the first time segment, where the first resource includes a resource corresponding to the first DMRS port;

sending, by the network device, indication information of the first resource to a terminal device; and receiving, by the network device from the terminal device, the first data information carried on the first resource.

In this embodiment, the network device determines the resource that is corresponding to the DMRS port and that is not used to transmit the DMRS; determines the first resource used to carry the first data information, where the first resource includes the resource that is corresponding to the at least one DMRS port of the plurality of DMRS ports of the network device and that is not used to transmit the DMRS; and sends the indication information of the first resource to the terminal device. In this way, the terminal device may use the first resource corresponding to the idle DMRS port of the network device to carry the first data information. Correspondingly, the network device may receive, from the terminal device, the first data information carried on the first resource. This improves communication resource utilization, avoids a waste of communication resources, and improves spectrum efficiency of a system.

In an embodiment of the third aspect, the method further includes:

determining, by the network device, a second resource used to carry second data information in a second time segment, where the second resource includes none of resources corresponding to all DMRS ports of the network device;

sending, by the network device, indication information of the second resource to the terminal device; and receiving, by the network device from the terminal device, the second data information carried on the second resource.

In this technical solution, the network device determines the second resource used to carry the second data information, where the second resource includes none of the resources corresponding to all the DMRS ports of the network device; and notifies the terminal device of the indication information of the second resource. Correspondingly, the network device may receive, from the terminal device, the second data information carried on the second resource. Information transmission between the network device and the terminal device is also implemented.

According to a fourth aspect, this application provides a communication method, including:

receiving, by a terminal device, indication information of a first resource from a network device;

determining, by the terminal device based on the indication information of the first resource, the first resource that is used to carry first data information in a first time segment, where the first resource includes a resource corresponding to a first DMRS port, the first DMRS port is one of at least one DMRS port of a plurality of DMRS ports of the network device, and a resource corresponding to the at least one DMRS port is not used to transmit a DMRS; and sending, by the terminal device to the network device, the first data information by using the first resource to carry the first data information.

In this technical solution, the terminal device determines, based on the indication information of the first resource that is received from the network device, the first resource used to carry the first data information in the first time segment, where the first resource includes the resource that is corresponding to the at least one DMRS port of the plurality of DMRS ports of the network device and that is not used to transmit the DMRS. The terminal device sends the first data information to the network device by using the first resource to carry the first data information. In this way, the terminal device may transmit the first data information on the resource corresponding to the idle DMRS port. This improves utilization efficiency of communication resources and improves spectrum efficiency of a system.

In an embodiment of the fourth aspect, the method further includes:

receiving, by the terminal device, indication information of a second resource from the network device;

determining, by the terminal device based on the indication information of the second resource, the second resource used to carry second data information in a second time segment, where the second resource includes none of resources corresponding to all DMRS ports of the network device; and sending, by the terminal device to the network device, the second data information by using the second resource to carry the second data information.

In this embodiment, the terminal device determines, based on the received indication information of the second resource, the second resource used to carry the second data information in the second time segment, and learns that the second resource includes none of the resources corresponding to all the DMRS ports of the network device. In this way, the terminal device may send the second data information to the network device by using the second resource to carry the second data information. Therefore, when none of the resources corresponding to all the DMRS ports of the network device is used to carry the second data information, uplink transmission between the terminal device and the network device can also be implemented.

In the communication methods provided in the foregoing aspects and the embodiments of the aspects of this application, meanings of the indication information of the second resource and the indication information of the first resource may be implemented by using the following possible implementations:

Optionally, the indication information of the second resource includes information indicating that the second resource includes none of the resources corresponding to the DMRS ports.

Optionally, the indication information of the second resource includes information used to indicate an index of a symbol included in the second resource.

Optionally, in an embodiment of the first aspect and the third aspect, the sending, by the network device, indication information of the second resource to the terminal device includes:

sending, by the network device, the indication information of the second resource to the terminal device by using UE-specific signaling or cell-specific/common signaling.

Optionally, in another embodiment of the first aspect and the third aspect, the sending, by the network device, indication information of the second resource to the terminal device includes:

sending, by the network device, the indication information of the second resource to the terminal device by using a physical downlink control channel PDCCH to carry the indication information of the second resource.

Correspondingly, in an embodiment of the second aspect and the fourth aspect, the receiving, by the terminal device, indication information of a second resource from the network device includes:

receiving, by the terminal device, the indication information of the second resource from the network device by using UE-specific signaling or cell-specific/common signaling.

Optionally, in another embodiment of the second aspect and the fourth aspect, the receiving, by the terminal device, indication information of a second resource from the network device includes:

receiving, by the terminal device from the network device, the indication information of the second resource that is carried on a physical downlink control channel PDCCH.

Optionally, the indication information of the first resource includes information used to indicate the resource corresponding to the first DMRS port.

Optionally, the information about the resource corresponding to the first DMRS port includes a port number of the first DMRS port or an index of the resource corresponding to the first DMRS port.

Optionally, the indication information of the first resource includes information used to indicate a resource corresponding to a second DMRS port other than the first DMRS port in the plurality of DMRS ports.

Optionally, the indication information of the first resource includes indication information of a third resource other than the resource corresponding to the first DMRS port in the first resource.

Optionally, the indication information of the third resource includes information used to indicate an index of a symbol included in the third resource.

Optionally, in still another embodiment of the first aspect and the third aspect, the sending, by the network device, indication information of the first resource to the terminal device includes:

sending, by the network device, the indication information of the first resource to the terminal device by using UE-specific signaling or cell-specific/common signaling.

Optionally, in yet another embodiment of the first aspect and the third aspect, the sending, by the network device, indication information of the first resource to the terminal device includes:

sending, by the network device, the indication information of the first resource to the terminal device by using a physical downlink control channel PDCCH to carry the indication information of the first resource.

Correspondingly, in still another embodiment of the second aspect and the fourth aspect, the receiving, by a terminal device, indication information of a first resource from a network device includes:

receiving, by the terminal device, the indication information of the first resource from the network device by using UE-specific signaling or cell-specific/common signaling.

Optionally, in yet another embodiment of the second aspect and the fourth aspect, the receiving, by a terminal device, indication information of a first resource from a network device includes:

receiving, by the terminal device from the network device, the indication information of the first resource that is carried on a physical downlink control channel PDCCH.

According to a fifth aspect, an embodiment of this application provides a network device. The network device includes a processor and a memory, where the memory is configured to store a program, and the processor invokes the program stored in the memory to perform the method provided in the first aspect of this application.

According to a sixth aspect, an embodiment of this application provides a terminal device. The terminal device includes a processor and a memory, where the memory is configured to store a program, and the processor invokes the program stored in the memory to perform the method provided in the second aspect of this application.

According to a seventh aspect, an embodiment of this application provides a network device. The network device includes a processor and a memory, where the memory is configured to store a program, and the processor invokes the program stored in the memory to perform the method provided in the third aspect of this application.

According to an eighth aspect, an embodiment of this application provides a terminal device. The terminal device includes a processor and a memory, where the memory is configured to store a program, and the processor invokes the program stored in the memory to perform the method provided in the fourth aspect of this application.

According to a ninth aspect, an embodiment of this application provides a network device, including at least one processing element (or a chip) configured to perform the method in the first aspect.

According to a tenth aspect, an embodiment of this application provides a terminal device, including at least one processing element (or a chip) configured to perform the method in the second aspect.

According to an eleventh aspect, an embodiment of this application provides a network device, including at least one processing element (or a chip) configured to perform the method in the third aspect.

According to a twelfth aspect, an embodiment of this application provides a terminal device, including at least one processing element (or a chip) configured to perform the method in the fourth aspect.

According to a thirteenth aspect, an embodiment of this application provides a communications system. The system includes the network device in the fifth aspect and the terminal device in the sixth aspect; or, the system includes the network device in the seventh aspect and the terminal device in the eighth aspect.

According to a fourteenth aspect, an embodiment of this application provides a computer readable storage medium. The computer readable storage medium stores an instruction, where when the instruction runs on a computer, the computer is enabled to perform the method in the first aspect.

According to a fifteenth aspect, an embodiment of this application provides a computer program product including an instruction, where when the instruction runs on a computer, the computer is enabled to perform the method in the first aspect.

According to a sixteenth aspect, an embodiment of this application provides a computer readable storage medium. The computer readable storage medium stores an instruction, where when the instruction runs on a computer, the computer is enabled to perform the method in the second aspect.

According to a seventeenth aspect, an embodiment of this application provides a computer program product including an instruction, where when the instruction runs on a computer, the computer is enabled to perform the method in the second aspect.

According to an eighteenth aspect, an embodiment of this application provides a computer readable storage medium. The computer readable storage medium stores an instruction, where when the instruction runs on a computer, the computer is enabled to perform the method in the third aspect.

According to a nineteenth aspect, an embodiment of this application provides a computer program product including an instruction, where when the instruction runs on a computer, the computer is enabled to perform the method in the third aspect.

According to a twentieth aspect, an embodiment of this application provides a computer readable storage medium. The computer readable storage medium stores an instruction, where when the instruction runs on a computer, the computer is enabled to perform the method in the fourth aspect.

According to a twenty-first aspect, an embodiment of this application provides a computer program product including an instruction, where when the instruction runs on a computer, the computer is enabled to perform the method in the fourth aspect.

In the foregoing aspects, when the network device performs downlink transmission with the terminal device, the network device determines that the resource corresponding to the at least one DMRS port of the plurality of DMRS ports of the network device is not used to transmit the DMRS in the first time segment; and determines the first resource used to carry the first data information to be sent to the terminal device, where the first resource includes the resource that is corresponding to the at least one DMRS port and that is not used to transmit the DMRS. The network device sends the indication information of the first resource to the terminal device. The terminal device determines, based on the received indication information of the first resource, the first resource used to carry the first data information in the first time segment; and receives, from the network device, the first data information carried on the first resource. In this way, the network device and the terminal device may transmit data information by using the idle resource. This avoids a waste of communication resources and improves spectrum efficiency. When the network device performs uplink transmission with the terminal device, the network device determines that the resource corresponding to the at least one DMRS port of the plurality of DMRS ports of the network device is not used to transmit the DMRS in the first time segment; and determines the first resource used to carry the first data information, where the first resource includes the resource that is corresponding to the at least one DMRS port and that is not used to transmit the DMRS. The network device sends the indication information of the first resource to the terminal device. The terminal device determines, based on the received indication information of the first resource, the first resource used to carry the first data information; and finally sends the first data information to the network device by using the first resource to carry the first data information. In this way, the terminal device and the network device may implement uplink data information transmission by using the resource corresponding to the idle DMRS port of the network device. This improves spectrum efficiency.

DESCRIPTION OF EMBODIMENTS

Figure 1:
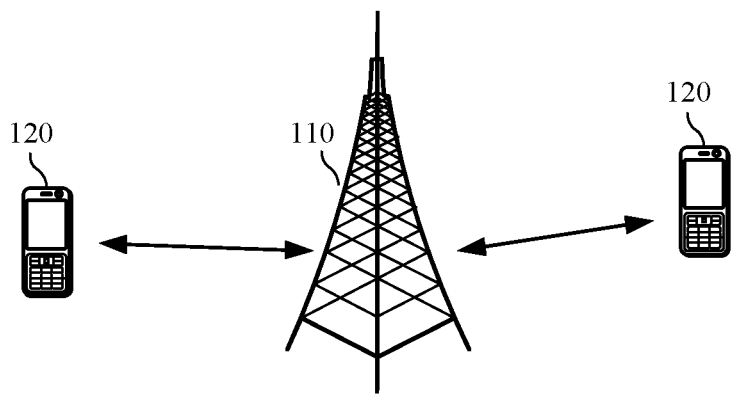
FIG. 1 is a schematic structural diagram of a communications system according to an embodiment of this application.

A communication method provided in the following embodiments of this application is applicable to a communications system. FIG. 1 is a schematic structural diagram of a communications system according to an embodiment of this application. As shown in FIG. 1, the communications system may include at least one network device 110 and a plurality of terminal devices 120 located in a coverage area of the network device 110. FIG. 1 shows one network device and two terminal devices in an example. Optionally, the communications system may include a plurality of network devices, and another quantity of terminal devices may be included in a coverage area of each network device. This is not limited in this embodiment of this application.

In other words, the communication method provided in the embodiments of this application may be applied to information transmission between a network device and a terminal device in a communications system. It should be understood that the information transmission may be downlink transmission of information sent from the network device to the terminal device, or may be uplink transmission of information sent by the terminal device and received by the network device. A specific mode is determined according to an actual requirement, and is not limited herein.

Optionally, the communications system may further include other network entities such as a network controller and a mobility management entity. This is not limited in the embodiments of this application.

The embodiments of this application may be applied to communications systems such as a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a General Packet Radio Service (General Packet Radio Service, GPRS) system, a Long Term Evolution (Long Term Evolution, LTE) system, an LTE frequency division duplexing (frequency division duplexing, FDD) system, an LTE time division duplexing (time division duplexing, TDD) system, a Universal Mobile Telecommunications System (Universal Mobile Telecommunications System, UMTS), and another wireless communications system that uses an orthogonal frequency division multiplexing (orthogonal frequency division multiplexing, OFDM) technology. Network architectures and service scenarios that are described in the embodiments of this application are intended to describe the technical solutions in the embodiments of this application more clearly, but do not constitute a limitation on the technical solutions provided in the embodiments of this application. A person of ordinary skill in the art may learn that with evolution of the network architectures and emergence of new service scenarios, the technical solutions provided in the embodiments of this application are also applicable to resolve a similar technical problem.

A network device in the embodiments of this application may be configured to provide a wireless communication function for a terminal device. The network device may include a macro base station, a micro base station (also referred to as a small cell), a relay node, an access point, and the like that are in various forms. The network device may be a base transceiver station (base transceiver station, BTS) in GSM or CDMA, may be a nodeB (nodeB, NB) in WCDMA, may be an evolved NodeB (evolved nodeB, eNB, or e-NodeB) in LTE, or may be a corresponding device gNB in a 5G network. For ease of description, in all the embodiments of this application, all the foregoing apparatuses that provide a wireless communication function for the terminal device are collectively referred to as a network device.

In the embodiments of this application, the terminal device is also referred to as user equipment (User Equipment, UE), a mobile station (mobile station, MS), a mobile terminal (mobile terminal), a terminal (terminal), or the like. The terminal device may communicate with one or more core networks through a radio access network (radio access network, RAN). For example, the terminal device may be a mobile phone (also referred to as a "cellular" phone) or a computer with a mobile terminal, or the like. For example, the terminal device may be a portable, pocket-sized, handheld, computer built-in, or in-vehicle mobile apparatus that exchanges voice and/or data with the radio access network. This is not specifically limited in the embodiments of this application.

In the embodiments of this application, "a plurality of" refers to two or more than two. The term "and/or" describes an association relationship between associated objects and indicates that three relationships may exist. For example, A and/or B may indicate the following three cases: Only A exists, both A and B exist, and only B exists. The character "/" usually represents an "or" relationship between the associated objects.

The following briefly describes applicable scenarios of the embodiments of this application.

A wireless communications system includes an existing Long Term Evolution/Long Term Evolution advanced communications system and a new radio (new radio, NR) system that is being developed. In the wireless communications system, an orthogonal frequency division multiple access mode is usually used for a downlink multiple access mode. A main characteristic of the orthogonal frequency division multiple access mode is that: A transmission resource is divided into orthogonal REs, and a signal sent by a transmit end is carried on an RE to be transmitted to a receive end. Because different REs are orthogonal to each other, the receive end may separately receive a signal sent on each RE.

Considering a fading characteristic of a radio channel between the transmit end and the receive end, the signal carried on the RE is distorted after being transmitted through the channel. Generally, the distortion is referred to as a channel coefficient. To recover the signal at the receive end, the receive end needs to estimate the channel coefficient. In the prior art, a pilot-based solution is usually used. To be specific, a transmit end transmits a known signal on a specific RE; and a receive end estimates a channel coefficient based on a received signal and the known signal, performs interpolation on a channel coefficient on another RE based on the channel coefficient obtained through the estimation, and then receives and demodulates a data signal by using the estimated channel coefficient.

The embodiments of this application are mainly intended for a future new radio communications system, and time division multiplexing or frequency division multiplexing is mainly used between DMRSs. If the prior-art solution is still directly used, an RE corresponding to an unused DMRS port is neither used to transmit a DMRS nor used to send data information, resulting in a waste of communication resources and low spectrum efficiency of the system. This application provides a communication method and a network device, to avoid a waste of communication resources and improves spectrum efficiency of a system.

In the embodiments, to improve spectrum efficiency of a communications system, the network device needs to first determine a usage situation of a plurality of DMRS ports of the network device. Before determining the usage situation of the plurality of DMRS ports of the network device is described, a multiplexing mode of a DMRS antenna port in the communications system is briefly described first.

Figure 2:
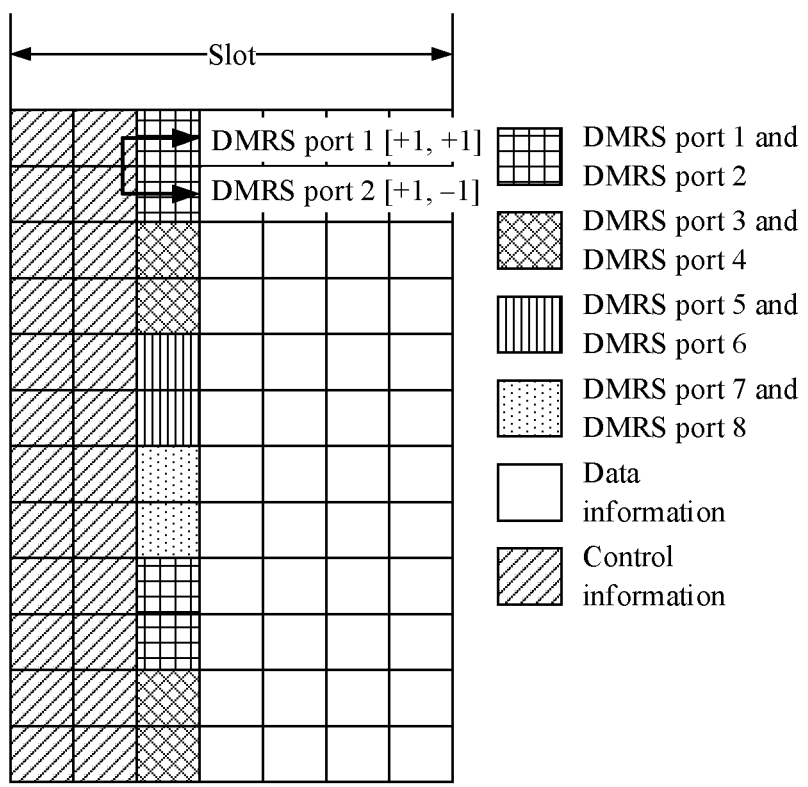
FIG. 2 is a schematic diagram of a DMRS pattern of an antenna port in a communications system.

FIG. 2 is a schematic diagram of a DMRS pattern of an antenna port in a communications system. As shown in FIG. 2, optionally, a network device may be equipped with eight antennas to implement spatial multiplexing transmission by using a MIMO technology, that is, eight DMRS ports are defined in the communications system. Accordingly, the network device can support transmission on a maximum of eight spatial layers. As shown in FIG. 2, a time division/frequency division multiplexing mode is used at a DMRS port. In the schematic diagram of the DMRS pattern, a horizontal direction represents a time domain, a vertical direction represents a frequency domain, each small block represents an RE, RE locations corresponding to a DMRS port 1 and a DMRS port 2 represent transmission locations of DMRSs at an antenna port 1 and an antenna port 2, and the antenna port 1 and the antenna port 2 are multiplexed in an orthogonal code division manner. Distribution and multiplexing modes of a DMRS port 3 and a DMRS port 4, a DMRS port 5 and a DMRS port 6, and a DMRS port 7 and a DMRS port 8 are similar to those of the DMRS port 1 and the DMRS port 2. Details are not described herein. Generally, a time domain resource, a frequency domain resource, and a code domain resource of an RE that is corresponding to one antenna port and that is used to transmit a DMRS are referred to as a DMRS pattern of the antenna port.

Figure 3:
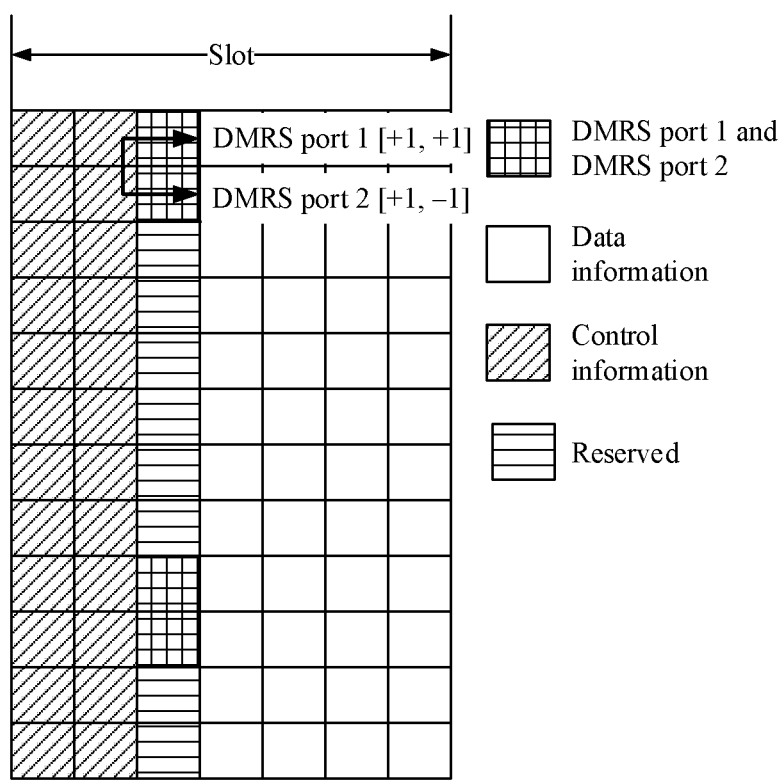
FIG. 3 is a schematic diagram of scheduling only some DMRS ports by a network device according to the embodiment shown in FIG. 2.

FIG. 3 is a schematic diagram of scheduling some DMRS ports by a network device according to the embodiment shown in FIG. 2. As shown in FIG. 3, eight DMRS ports are defined in a communications system, that is, the network device supports transmission on a maximum of eight spatial layers. The network device schedules only two spatial layers, and a DMRS port 1 and a DMRS port 2 are allocated to only the two spatial layers. As shown in FIG. 3, the network device transmits information only on REs corresponding to the DMRS port 1 and the DMRS port 2, and REs corresponding to defined DMRS ports 3, 4, 5, 6, 7, and 8 are neither used to transmit a DMRS nor used to send data information.

Figure 4:
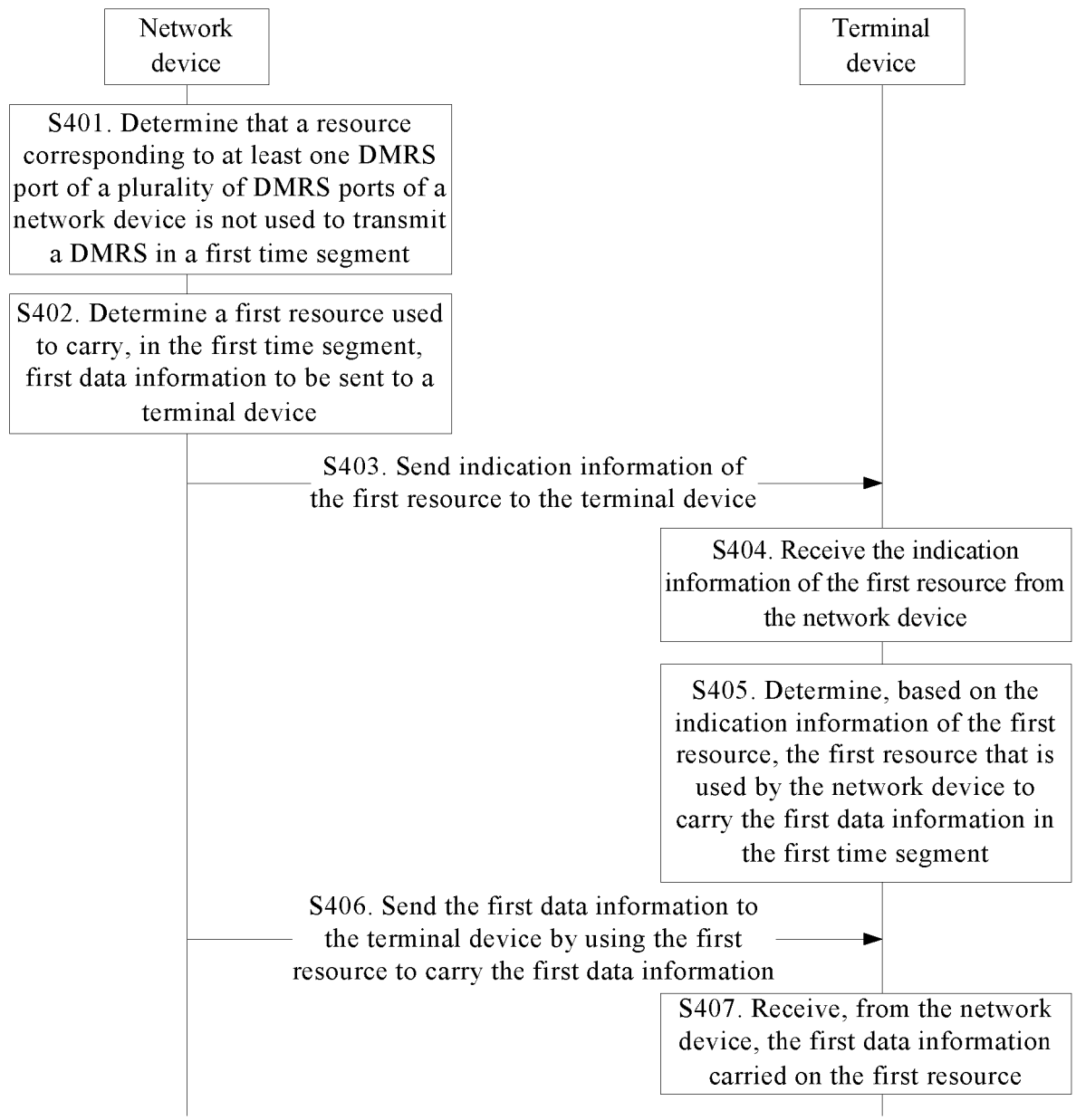
FIG. 4 is a schematic interaction diagram of a communication method according to an embodiment of this application.

FIG. 4 is a schematic interaction diagram of a communication method according to an embodiment of this application. As shown in FIG. 4, this method may include the following steps.

S401. A network device determines that a resource corresponding to at least one DMRS port of a plurality of DMRS ports of the network device is not used to transmit a DMRS in a first time segment.

The at least one DMRS port includes a first DMRS port.

In this embodiment, when the network device needs to send information to a terminal device, the network device first determines the first time segment required for sending the information. Optionally, the first time segment may be duration (duration) occupied by the network device for sending information. For example, the first time segment may specifically be one or more subframes (subframe), may be one or more slots (slot), may be one or more mini-slots (mini-slot), or may be one or more symbols. This is not limited herein. When the duration is a plurality of subframes/slots/mini-slots/symbols, the plurality of subframes/slots/mini-slots/symbols may be consecutive subframes/slots/mini-slots/symbols, or may be subframes/slots/mini-slots/symbols that are not completely consecutive. This is not limited herein. Then, the network device determines that the resource corresponding to the at least one DMRS port of the plurality of DMRS ports of the network device is not used to transmit the DMRS in the first time segment. In other words, the network device does not schedule all spatial layers, and an unused resource corresponding to the at least one DMRS port exists.

In an embodiment, the at least one DMRS port to which the resource not used to transmit the DMRS is corresponding includes the first DMRS port, and the first DMRS port is one or more of the plurality of DMRS ports of the network device. A quantity of first DMRS ports is not limited herein.

S402. The network device determines a first resource used to carry, in the first time segment, first data information to be sent to the terminal device.

In this embodiment, the first resource includes a resource corresponding to the first DMRS port.

Optionally, when the network device needs to send the first data information to the terminal device, the network device first determines a bearer used to transmit the first data information in the first time segment, that is, the first resource used to carry the first data information. The first data information in this embodiment is data information to be transmitted in the first time segment.

Optionally, the first resource determined by the network device includes the resource corresponding to the first DMRS port and a third resource other than the resource corresponding to the first DMRS port.

Optionally, the third resource is a resource that is predetermined by the network device and that is used to send a physical downlink shared channel (Physical Downlink Shared Channel, PDSCH) in the first time segment. It should be noted that in this embodiment, the resource corresponding to the first DMRS port is used to carry data information. However, this is not limited herein that the resource corresponding to the first DMRS port can be used to carry only the data information. In another embodiment, the resource may also be used to carry control information.

Further, it can be learned from the foregoing steps that, the resource corresponding to the first DMRS port is not used to transmit the DMRS in the first time segment. Accordingly, the network device may use the resource corresponding to the first DMRS port and another unused resource to carry the first data information. In this embodiment, resources that are determined by the network device and that may be used to carry the first data information in the first time segment are collectively referred to as the first resource.

S403. The network device sends indication information of the first resource to the terminal device.

Optionally, after the network device determines the first resource used to carry the first data information, the network device sends the indication information of the first resource to the terminal device. So that the terminal device may determine, based on the indication information of the first resource, the first resource used to carry the first data information when the network device sends the first data information.

Optionally, the indication information of the first resource includes information used to indicate the resource corresponding to the first DMRS port. Because the resource corresponding to the first DMRS port is not used to transmit the DMRS in the first time segment, the resource corresponding to the first DMRS port is used to transmit the first data information.

In an example, the information about the resource corresponding to the first DMRS port includes a port number of the first DMRS port. In this case, the terminal device may determine, based on the port number of the first DMRS port, the resource that is corresponding to the first DMRS port and that carries the first data information.

For example, the indication information of the resource corresponding to the first DMRS port may occupy a 2-bit field. In this case, a case in which the plurality of DMRS ports include two DMRS ports is used as an example, and a meaning of the 2-bit field indication information may be shown in Table 1. Table 1 shows a meaning of the indication information when the indication information of the first resource is the 2-bit field. For example, a state 01 indicates a DMRS port 1. In this case, the terminal device may determine that a resource corresponding to the DMRS port 1 carries the first data information. A state 10 indicates a DMRS port 2. In this case, the terminal device may determine that a resource corresponding to the DMRS port 2 carries the first data information. A state 11 indicates the DMRS port 1 and the DMRS port 2. In this case, the terminal device may determine that the resources corresponding to the DMRS port 1 and the DMRS port 2 carry the first data information. The field may further include a reserved state indication, for example, a state 00 in Table 1. This state may be understood as not indicating any DMRS port. In this case, the terminal device determines that none of resources corresponding to all DMRS ports including the DMRS port 1 and the DMRS port 2 carries the first data information.

TABLE 1

| Value | Indication meaning |
|---|---|
| 00 | Reserved |
| 01 | DMRS port 1 |
| 10 | DMRS port 2 |
| 11 | DMRS port 1 and DMRS port 2 |

Optionally, the indication information of the resource corresponding to the first DMRS port may be a 4-bit field. In this case, a case in which the plurality of DMRS ports include eight DMRS ports is used as an example, and a meaning of the 4-bit field indication information may be shown in Table 2. Table 2 shows an indication meaning of an $i^{th}$ bit when the indication information of the first resource is the 4-bit field. For example, the (i (i=1, 2, 3, 4))$^{th}$ bit in the 4-bit field is used to indicate a DMRS port (2i-1) and a DMRS port 2i. A state 0 indicates a reserved state or is understood as not indicating the DMRS port (2i-1) and the DMRS port 2i. In this case, the terminal device determines that resources corresponding to the DMRS port (2i-1) and the DMRS port 2i do not carry the first data information. A state 1 indicates the DMRS port (2i-1) and the DMRS port 2i. In this case, the terminal device determines that the resources corresponding to the DMRS port (2i-1) and the DMRS port 2i carry the first data information.

TABLE 2

| Value | Indication meaning of an $i^{th}$ bit |
|---|---|
| 0 | Reserved |
| 1 | DMRS port (2i-1) and DMRS port 2i |

It should be noted that, a quantity of bits of the field included in the indication information of the resource corresponding to the first DMRS port may alternatively be another value except 2 and 4, and an indication meaning of each state of the field is not limited to that in Table 1 and Table 2. The quantity of bits of the field included in the indication information of the resource corresponding to the first DMRS port and the indication meaning of each state of the corresponding field may be determined according to an actual requirement. This is not limited in this embodiment.

In another example, the information about the resource corresponding to the first DMRS port includes an index of the resource corresponding to the first DMRS port. The index may be understood as a number or a sequence number of the resource corresponding to the first DMRS port. This is not limited herein. In this case, the terminal device may determine, based on information about the index of the resource corresponding to the first DMRS port, the first resource carrying the first data information.

For example, indication information of the index of the resource corresponding to the first DMRS port may be a 2-bit field. In this case, a case in which the plurality of DMRS ports include two DMRS ports is used as an example. A resource corresponding to a DMRS port 1 is a resource 1 (resource index 1), and a resource corresponding to a DMRS port 2 is a resource 2. A meaning of the 2-bit field indication information may be shown in Table 3. Table 3 shows a meaning of the indication information when the indication information of the index is the 2-bit field. For example, a state 01 indicates the resource 1. In this case, the terminal device may determine that the resource 1 carries the first data information. A state 10 indicates the resource 2. In this case, the terminal device may determine that the resource 2 carries the first data information. A state 11 indicates the resource 1 and the resource 2. In this case, the terminal device may determine that both the resource 1 and the resource 2 carry the first data information. The field may further include a reserved state indication, for example, a state 00 in Table 1. The state may be understood as not indicating any resource. In this case, the terminal device determines that neither of the resource 1 and the resource 2 carries the first data information.

TABLE 3

| Value | Indication meaning |
| --- | --- |
| 00 | Reserved |
| 01 | Resource 1 |
| 10 | Resource 2 |
| 11 | Resource 1 and resource 2 |

The indication information of the index of the resource corresponding to the first DMRS port may alternatively be a 4-bit field. In this case, in a case in which the plurality of DMRS ports include eight DMRS ports is used as an example, and resources corresponding to a DMRS port (2i-1) and a DMRS port 2i (i=1, 2, 3, 4) are resources i. A meaning of the 4-bit field indication information may be shown in Table 4. Table 4 shows an indication meaning of an $i^{th}$ bit when the indication information of the index of the resource corresponding to the first DMRS port is the 4-bit field. For example, the (i (i=1, 2, 3, 4))$^{th}$ bit in the 4-bit field is corresponding to the resource i. A state 0 indicates a reserved state or is understood as not indicating the resource i. In this case, the terminal device determines that the resource i does not carry the first data information. A state 1 indicates the resource i. In this case, the terminal device determines that the resource i carries the first data information.

TABLE 4

| Value | Indication meaning of an $i^{th}$ bit |
| --- | --- |
| 0 | Reserved |
| 1 | Resource i |

Optionally, the indication information of the first resource includes information used to indicate a resource corresponding to a second DMRS port other than the first DMRS port in the plurality of DMRS ports. In this case, the terminal device may determine that the resource corresponding to the second DMRS port other than the first DMRS port in the plurality of DMRSs does not carry the first data information, so as to indirectly determine the resource corresponding to the first DMRS port and determine the first resource carrying the first data information.

In an example, the information about the resource corresponding to the second DMRS port other than the first DMRS port in the plurality of DMRS ports includes a port number of the second DMRS port. In this case, the terminal device may indirectly determine the port number of the first DMRS port based on the port number of the second DMRS port, and determine the resource corresponding to the first DMRS port, so as to determine the first resource carrying the first data information.

For example, the indication information of the resource corresponding to the second DMRS port may alternatively be shown in Table 1 or Table 2. Table 1 is used as an example. The state 01 indicates the DMRS port 1. In this case, the terminal device may determine that the resource corresponding to the DMRS port 1 does not carry the first data information, and determine that the resource corresponding to the DMRS port 2 carries the first data information. The state 10 indicates the DMRS port 2. In this case, the terminal device may determine that the resource corresponding to the DMRS port 2 does not carry the first data information, and determine that the resource corresponding to the DMRS port 1 carries the first data information. The state 11 indicates the DMRS port 1 and the DMRS port 2. In this case, the terminal device may determine that the resources corresponding to the DMRS port 1 and the DMRS port 2 do not carry the first data information. The field may further include a reserved state indication, for example, the state 00 in Table 1. The state may be understood as not indicating any DMRS port. In this case, the terminal device determines that the resources corresponding to all the DMRS ports including the DMRS port 1 and the DMRS port 2 carry the first data information.

In another example, the information of the resource corresponding to the second DMRS port other than the first DMRS port in the plurality of DMRS ports includes an index of the resource corresponding to the second DMRS port. In this case, the terminal device may determine, based on information about the index of the resource corresponding to the second DMRS port, a resource not carrying the first data information, so as to indirectly determine the first resource carrying the first data information.

For example, the indication information of the resource corresponding to the second DMRS port may alternatively be shown in Table 1, Table 2, Table 3, or Table 4. For an example for describing a specific meaning of the indication information of the resource corresponding to the second DMRS port, refer to the foregoing description of Table 1, Table 2, Table 3, or Table 4. Details are not described herein.

Optionally, the indication information of the first resource includes indication information of a third resource other than the resource corresponding to the first DMRS port in the first resource.

In this embodiment, the indication information of the first resource includes the information used to indicate the resource corresponding to the first DMRS port and includes the indication information of the third resource. In this way, after the terminal device receives the indication information of the first resource, the terminal device may determine, based on the information used to indicate the resource corresponding to the first DMRS port, resource of the first resource used to carry the first data information, and determine, based on the indication information of the third resource, resource of the first resource used to transmit the DMRS, so as to receive the DMRS and the first data information that the network device uses the first resource to carry.

In an example, the indication information of the third resource includes information used to indicate an index of a symbol included in the third resource.

For example, referring to FIG. 3, when the network device schedules only two spatial layers, to be specific, transmits information on only REs corresponding to the DMRS port 1 and the DMRS port 2, the REs corresponding to the DMRS port 1 and the DMRS port 2 are referred to as third resource. As shown in FIG. 3, the third resource includes seven symbols in a slot, where first and second symbols are used to carry control information, a third symbol is used to transmit a DMRS, and fourth to seventh symbols are used to transmit data information. Therefore, after receiving the indication information of the third resource, the terminal device determines, based on the information about the index, indicated in the indication information of the third resource, of the symbol included in the third resource, a symbol carrying the data information, and further receives, from the corresponding symbol, the data information transmitted by the network device. It should be noted that the third resource may alternatively include one or more symbols in the seven symbols, and the plurality of symbols may be consecutive symbols or may be symbols that are not completely consecutive.

Optionally, when the network device determines that a resource corresponding to a target DMRS port in the plurality DMRS ports is not used to transmit a DMRS, the indication information of the first resource indicates that the network device sends data information on the resource corresponding to the target DMRS port.

Optionally, in this embodiment, the network device may send the indication information of the first resource to the terminal device in the following manner.

In an implementation, the network device sends the indication information of the first resource to the terminal device by using UE-specific (UE-specific) signaling or cell-specific (cell-specific)/common (common) signaling.

Herein, the UE-specific signaling may be referred to signaling sent by the network device to one terminal device, and the cell-specific/common signaling may be referred to one signaling sent by the network device to a plurality of terminal devices in a cell.

Optionally, the network device may send the indication information of the first resource to the terminal device in a dynamic notification manner. For example, the network device sends the indication information of the first resource to the terminal device by using a physical downlink control channel (physical downlink control channel, PDCCH) to carry the indication information of the first resource.

S404. The terminal device receives the indication information of the first resource from the network device.

Optionally, the terminal device receives the indication information of the first resource in a receiving manner corresponding to a manner of sending the indication information of the first resource by the network device. For example, when the network device sends the indication information of the first resource to the terminal device by using UE-specific signaling or cell-specific/common signaling, the terminal device receives, by using the UE-specific signaling or the cell-specific/common signaling, the indication information of the first resource sent by the network device. Alternatively, when the network device sends the indication information of the first resource to the terminal device by using a PDCCH to carry the indication information of the first resource, the terminal device receives the indication information of the first resource that the network device uses the PDCCH to carry.

S405. The terminal device determines, based on the indication information of the first resource, the first resource that is used by the network device to carry the first data information in the first time segment.

Correspondingly, the first resource includes the resource corresponding to the first DMRS port, the first DMRS port is one of the at least one DMRS port of the plurality of DMRS ports of the network device, and the resource corresponding to the at least one DMRS port is not used to transmit the DMRS.

In this embodiment, it can be learned from the foregoing step 403 that the indication information of the first resource is used to indicate the information about the resource corresponding to the first DMRS port or the indication information of the third resource other than the information about the resource corresponding to the first DMRS port in the first resource. Therefore, after the terminal device receives the indication information of the first resource sent by the network device, the terminal device can determine, based on the indication information of the first resource, the first resource that is used by the network device to carry the first data information in the first time segment.

S406. The network device sends the first data information to the terminal device by using the first resource to carry the first data information.

In this embodiment, after the network device determines the first resource used to transmit the first data information in the first time segment, the network device may send the first data information to the terminal device by using the first resource to carry the first data information. In this case, the network device sends the first data information by using a resource that is corresponding to a port of the network device and that is not used to transmit a DMRS. This avoids a waste of communication resources and improves frequency efficiency of a system.

S407. The terminal device receives, from the network device, the first data information carried on the first resource.

After determining, by parsing the received indication information of the first resource, the first resource that is that is used by the network device to carry the first data information in the first time segment, the terminal device listens to the network device and receives, from the network device, the first data information carried on the first resource. In this way, downlink transmission between the network device and the terminal device is implemented. An uplink transmission solution between the network device and the terminal device is similar to the downlink transmission solution, and details are not described herein.

According to the communication method provided in this embodiment of this application, the network device determines that the resource corresponding to the at least one DMRS port of the plurality of DMRS ports of the network device is not used to transmit the DMRS in the first time segment, and determines the first resource used to carry, in the first time segment, the first data information to be sent to the terminal device. The first resource includes the resource that is corresponding to the at least one of the plurality of DMRS ports of the network device and that is not used to transmit the DMRS. The network device sends the indication information of the first resource to the terminal device. Correspondingly, the terminal device determines, based on the received indication information of the first resource, the first resource that is used by the network device to carry the first data information in the first time segment. Finally, after the network device sends the first data information to the terminal device by using the first resource to carry the first data information, the terminal device receives, from the network device, the first data information carried on the first resource. In the technical solution of this embodiment, the network device determines the resource that is corresponding to the DMRS port and that is not used to transmit the DMRS, and transmits data information by using the idle resource. This avoids a waste of communication resources and improves spectrum efficiency.

Figure 5:
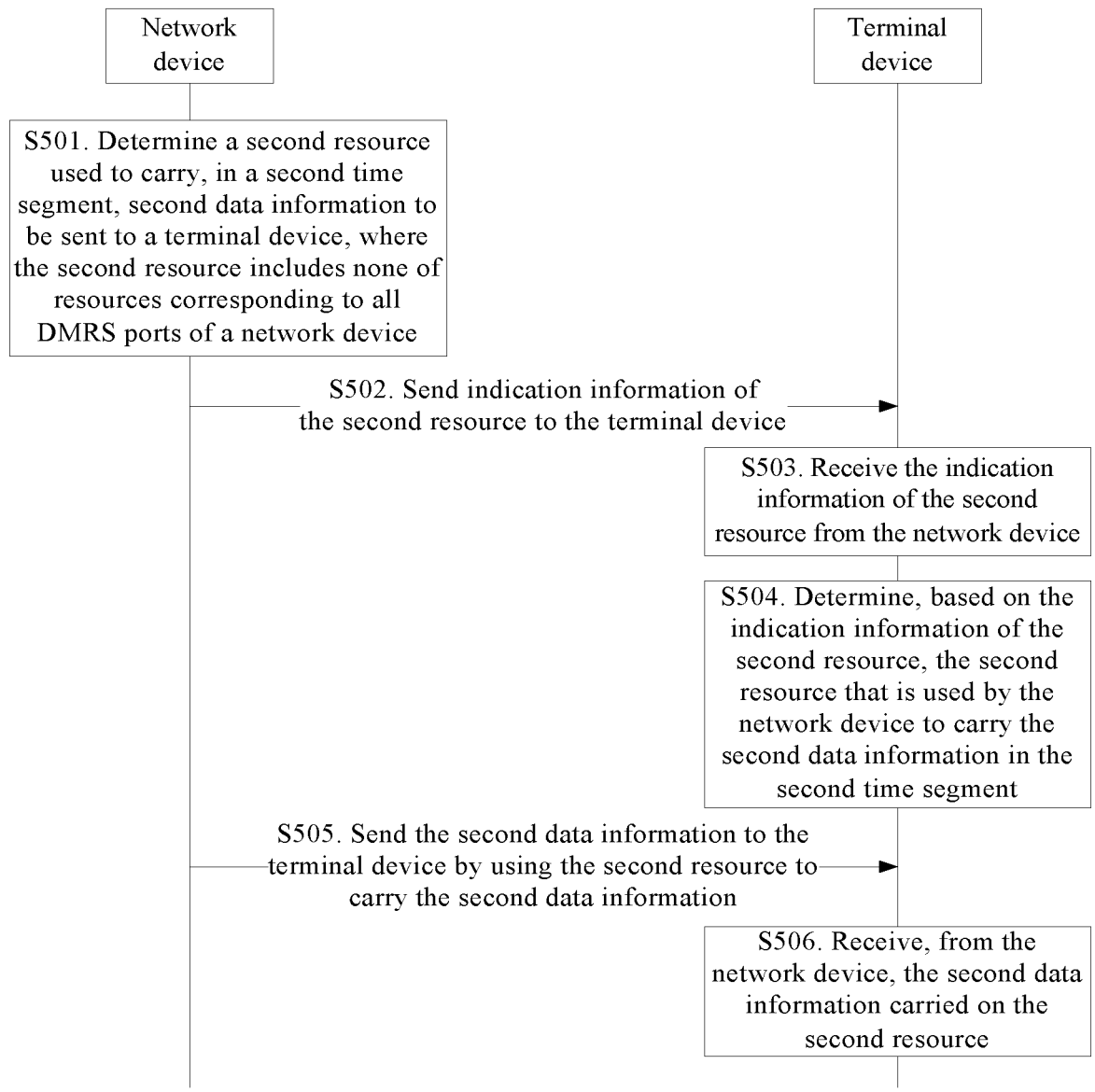
FIG. 5 is a schematic interaction diagram of another communication method according to an embodiment of this application.

Further, this application provides a communication method based on the embodiment shown in FIG. 4. FIG. 5 is a schematic interaction diagram of another communication method according to an embodiment of this application. The communication method provided in this embodiment of this application is a supplementary description for the communication method provided in the embodiment shown in FIG. 4. As shown in FIG. 5, the communication method may include the following steps.

S501. A network device determines a second resource used to carry, in a second time segment, second data information to be sent to a terminal device, where the second resource includes none of resources corresponding to all DMRS ports of the network device.

In an example, all the resources corresponding to the DMRS ports of the network device may be used for DMRS transmission, or an idle DMRS port in a plurality of DMRS ports of the network device is used for another purpose (for example, power divert) but not used to transmit data information. In this case, none of the resources corresponding to all the DMRS ports of the network device can be used to carry data information. Therefore, in this embodiment, the network device first determines the second resource used to carry, in the second time segment, the second data information to be sent to the terminal device. In this case, the second resource includes none of the resources corresponding to all the DMRS ports of the network device.

It should be noted that a definition of the second time segment in this embodiment is similar to that of the first time segment. The second time segment may also be duration (duration) occupied by the network device for sending information. For example, the second time segment may be one or more subframes (subframe), may be one or more slots (slot), may be one or more mini-slots (mini-slot), or may be one or more symbols. This is not limited herein. When the duration is a plurality of subframes/slots/mini-slots/symbols, the plurality of subframes/slots/mini-slots/symbols may be consecutive subframes/slots/mini-slots/symbols, or may be subframes/slots/mini-slots/symbols that are not completely consecutive. This is not limited herein. The second data information in this embodiment is data information to be transmitted in the second time segment.

S502. The network device sends indication information of the second resource to the terminal device.

S502 is similar to the foregoing step S403. After the network device determines the second resource used to carry the second data information in the second time segment, the network device sends the indication information of the second resource to the terminal device, so that the terminal device may determine, based on the indication information of the second resource, the second resource used to carry the second data information when the network device sends the second data information.

Optionally, in an implementation, the indication information of the second resource includes information used to indicate that the second resource includes none of the resources corresponding to all the DMRS ports of the network device.

Because the second resource includes none of the resources corresponding to all the DMRS ports of the network device, the indication information of the second resource is used to indicate that the second resource includes none of the resources corresponding to all the DMRS ports of the network device. Therefore, the network device may send the second data information on none of the resources corresponding to all the DMRS ports of the network device.

In another implementation, the indication information of the second resource includes information used to indicate an index of a symbol included in the second resource.

In this embodiment, when the network device determines the second resource used to carry the second data information, the network device further needs to determine specific information of the second resource, for example, information such as a quantity of symbols included in the second resource and an index of a symbol used to carry the second data information.

Optionally, when the network device determines that a resource corresponding to a target DMRS port of the network device is not used to transmit a DMRS, the indication information of the second resource indicates that the network device does not send the data information on the resource corresponding to the target DMRS port.

For example, the indication information of the second resource may be a 2-bit field. In this case, a case in which the plurality of DMRS ports include two DMRS ports is used as an example, and a meaning of the 2-bit field indication information may be shown in Table 1. In this embodiment, a value of the 2-bit field is 00, and this state may be understood as not indicating any DMRS port. In this case, the terminal device determines that none of the resources corresponding to all the DMRS ports including a DMRS port 1 and a DMRS port 2 carries the second data information, so as to determine the second resource.

Optionally, S502 is similar to step S404 in the embodiment shown in FIG. 4. In this embodiment, the network device may send the indication information of the second resource to the terminal device in the following manner.

In an implementation, the network device sends the indication information of the second resource to the terminal device by using UE-specific signaling or cell-specific/common signaling. In another implementation, the network device sends the indication information of the second resource to the terminal device by using a PDCCH to carry the indication information of the second resource.

S503. The terminal device receives the indication information of the second resource from the network device.

When the network device sends the indication information of the second resource to the terminal device by using UE-specific signaling or cell-specific/common signaling, the terminal device receives, by using the UE-specific signaling or the cell-specific/common signaling, the indication information of the second resource from the network device. When the network device sends the indication information of the second resource to the terminal device by using a PDCCH to carry the indication information of the second resource, the terminal device receives, from the network device, the indication information of the second resource that is carried on the PDCCH.

S504. The terminal device determines, based on the indication information of the second resource, the second resource that is used by the network device to carry the second data information in the second time segment.

The second resource includes none of the resources corresponding to all the DMRS ports of the network device.

In step S501, the network device determines that the second resource used to carry the second data information includes none of the resources corresponding to all the DMRS ports of the network device, and therefore the second resource determined by the terminal device correspondingly includes none of the resources corresponding to all the DMRS ports of the network device.

S505. The network device sends the second data information to the terminal device by using the second resource to carry the second data information.

In this embodiment, the network device determines that the second resource is used to carry the second data information in the second time segment. Therefore, after the network device sends the indication information of the second resource to the terminal device, the network device correspondingly sends the second data information to the corresponding terminal device by using the second resource to carry the second data information.

S506. The terminal device receives, from the network device, the second data information carried on the second resource.

The terminal device may determine, by parsing the received indication information of the second resource, the second resource that is used by the network device to carry the second data information in the second time segment, so as to receive, at the second resource, the second data information that the network device uses the second resource to carry.

According to the communication method provided in this embodiment of this application, the network device determines the second resource used to carry, in the second time segment, the second data information to be sent to the terminal device. The second resource includes none of the resources corresponding to all the DMRS ports of the network device. The network device sends the indication information of the second resource to the terminal device. Correspondingly, the terminal device determines, based on the received indication information of the second resource, the second resource that is used by the network device to carry the second data information in the second time segment. Finally, the terminal device receives, from the network device, the second data information carried on the second resource. In this technical solution, when none of the resources corresponding to all the DMRS ports of the network device can be used to carry the second data information, the network device determines the second resource used to carry the second data information, and notifies the terminal device of the indication information. In this way, information transmission between the network device and the terminal device can be implemented.

The foregoing embodiment describes downlink transmission between the network device and the terminal device (the network device sends information to the terminal device). The following describes uplink transmission between the network device and the terminal device (the network device receives information sent by the terminal device) with reference to a specific embodiment.

Figure 6:
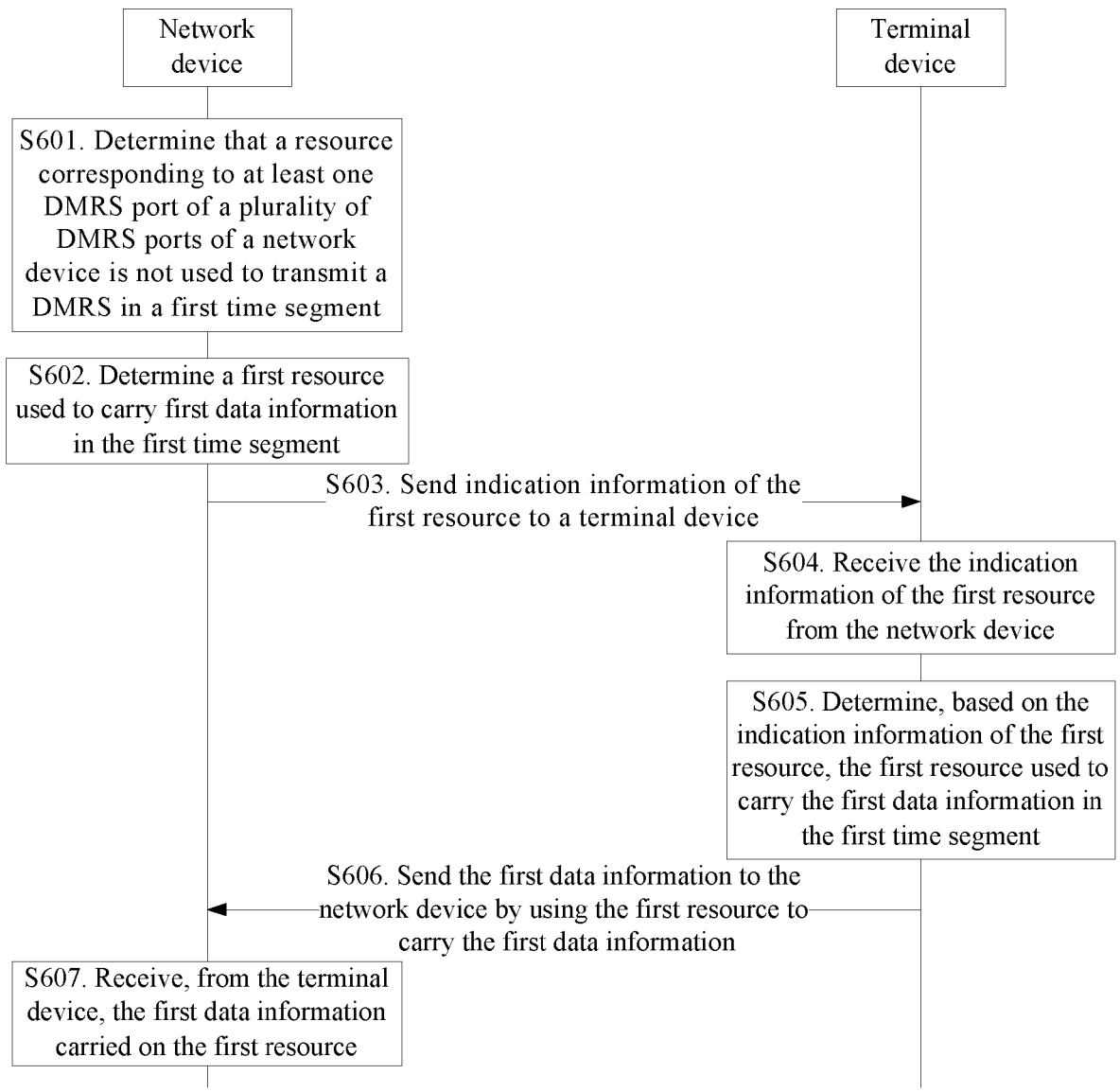
FIG. 6 is a schematic interaction diagram of still another communication method according to an embodiment of this application.

FIG. 6 is a schematic interaction diagram of still another communication method according to an embodiment of this application. As shown in FIG. 6, this method may include the following steps.

S601. A network device determines that a resource corresponding to at least one DMRS port of a plurality of DMRS ports of the network device is not used to transmit a DMRS in a first time segment.

The at least one DMRS port includes a first DMRS port.

In this embodiment, similar to downlink transmission of information sent by the network device to a terminal device, when the network device receives information sent by the terminal device, the network device first determines the first time segment for receiving the information, and then determines a usage situation of resources corresponding to the plurality of DMRS ports of the network device. In an example, the network device determines that the resource corresponding to the at least one DMRS port of the plurality of DMRS ports of the network device is not used to transmit the DMRS in the first time segment, and the at least one DMRS port includes the first DMRS port. In this case, the network device may receive data information sent by the terminal device by using a first resource.

Similar to that in the embodiment shown in FIG. 4, the first time segment in this embodiment may also be duration (duration) occupied by the network device for receiving information. For a specific representation of the first time segment, refer to the description in step S401 in the embodiment shown in FIG. 4. Details are not described herein.

Similarly, the first DMRS port in this step may also be one or more of the plurality of DMRS ports of the network device, and a quantity of first DMRS ports is not limited herein.

S602. The network device determines a first resource used to carry first data information in the first time segment.

Optionally, the first resource includes a resource corresponding to the first DMRS port.

In this embodiment, when the network device needs to receive the first data information sent by the terminal device, the network device first determines a bearer of the to-be-received first data information in the first time segment, that is, the first resource used to carry the first data information. The first data information in this embodiment is data information to be sent by the terminal device to the network device in the first time segment.

Optionally, the first resource that is determined by the network device and that is used to carry the first data information includes the resource corresponding to the first DMRS port and a third resource other than the resource corresponding to the first DMRS port. For a specific meaning of the third resource and a representation of the resource corresponding to the first DMRS port, refer to the description in step S402 in the embodiment shown in FIG. 4. Details are not described herein.

Optionally, the resource corresponding to the first DMRS port is not used to transmit the DMRS in the first time segment.

S603. The network device sends indication information of the first resource to the terminal device.

In this embodiment, after the network device determines the first resource used to carry the first data information, the network device needs to send the indication information of the first resource to the terminal device. In this way, the terminal device may determine, based on the indication information of the first resource, a resource that is corresponding to which DMRS port of the network device and that carries the first data information.

Optionally, the indication information of the first resource includes information used to indicate the resource corresponding to the first DMRS port. In an example, the information about the resource corresponding to the first DMRS port includes a port number of the first DMRS port. In another example, the information about the resource corresponding to the first DMRS port includes an index of the resource corresponding to the first DMRS port. For a specific example of the information about the resource corresponding to the first DMRS port, refer to the description in step S403 in the embodiment shown in FIG. 4. Details are not described herein.

Optionally, the indication information of the first resource includes indication information of a third resource other than the resource corresponding to the first DMRS port in the first resource. To be specific, the indication information of the first resource includes the information used to indicate the resource corresponding to the first DMRS port and includes the indication information of the third resource. In an example, the indication information of the third resource includes information used to indicate an index of a symbol included in the third resource.

Optionally, the network device may send the indication information of the first resource to the terminal device by using UE-specific signaling or cell-specific/common signaling, or the network device sends the indication information of the first resource to the terminal device by using a PDCCH to carry the indication information of the first resource.

S604. The terminal device receives the indication information of the first resource from the network device.

After the terminal device and the network device agree on an information sending manner, the terminal device receives the indication information of the first resource in the corresponding manner of sending the indication information of the first resource by the network device. For a specific receiving manner, refer to the description in step S404. Details are not described herein.

S605. The terminal device determines, based on the indication information of the first resource, the first resource used to carry the first data information in the first time segment.

In this embodiment, it can be learned from the foregoing step S601 that the first resource includes the resource corresponding to the first DMRS port, the first DMRS port is one of the at least one DMRS port of the plurality of DMRS ports of the network device, and the resource corresponding to the at least one DMRS port is not used to transmit the DMRS.

The terminal device learns, based on the indication information of the first resource sent by the network device, the bearer of the first data information to be sent by the terminal device to the network device, that is, the terminal device learns the first resource used to carry the first data information in the first time segment.

S606. The terminal device sends the first data information to the network device by using the first resource to carry the first data information.

In this embodiment, after the terminal device determines the first resource used to transmit the first data information in the first time segment, the terminal device may send the first data information to the network device by using the first resource to carry the first data information. In this case, the terminal device sends the first data information by using the unused resource corresponding to the DMRS port of the network device. This avoids a waste of communication resources and improves frequency efficiency of a system.

S607. The terminal device receives, from the network device, the first data information carried on the first resource.

In step S601, the network device has determined the first resource used to carry the first data information in the first time segment, and the network device sends the indication information of the first resource to the terminal device. Therefore, when the terminal device sends the first data information to the network device by using the first resource, the network device may receive, from the terminal device, the first data information carried on the first resource. In this way, uplink transmission between the network device and the terminal device is implemented.

According to the communication method provided in this embodiment of this application, the network device determines that the resource corresponding to the at least one DMRS port of the plurality of DMRS ports of the network device is not used to transmit the DMRS in the first time segment, and determines the first resource used to carry the first data information in the first time segment. The first resource includes the resource that is corresponding to the at least one of the plurality of DMRS ports of the network device and that is not used to transmit the DMRS. The network device sends the indication information of the first resource to the terminal device. The terminal device determines, based on the received indication information of the first resource, the first resource used to carry the first data information in the first time segment, and finally sends the first data information to the network device by using the first resource to carry the first data information, so that the network device may receive, from the terminal device, the first data information carried on the first resource. In the technical solution of this embodiment, the network device determines the resource that is corresponding to the DMRS port and that is not used to transmit the DMRS, and the terminal device transmits data information by using the resource corresponding to the idle DMRS port of the network device. This avoids a waste of communication resources and improves spectrum efficiency.

Figure 7:
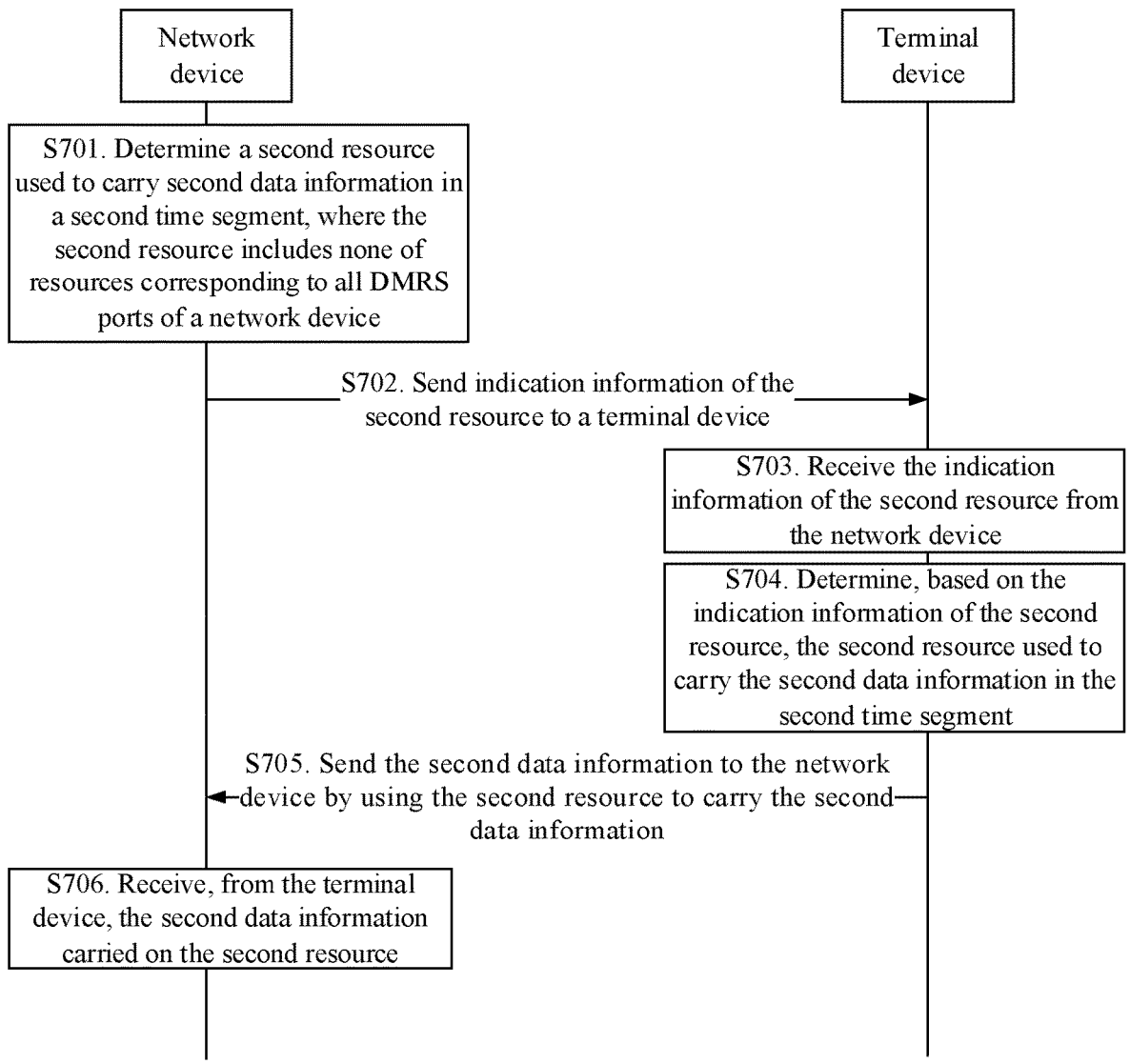
FIG. 7 is a schematic interaction diagram of yet another communication method according to an embodiment of this application.

Further, this application provides a communication method based on the embodiment shown in FIG. 6. FIG. 7 is a schematic interaction diagram of yet another communication method according to an embodiment of this application. The communication method provided in this embodiment of this application is a supplementary description for the communication method provided in the embodiment shown in FIG. 6. As shown in FIG. 7, the communication method may include the following steps.

S701. A network device determines a second resource used to carry second data information in a second time segment, where the second resource includes none of resources corresponding to all DMRS ports of the network device.

In this embodiment, in the second time segment, when a resource corresponding to a DMRS port of the network device may be in a busy state (for example, all the DMRS ports are used for DMRS transmission or an idle DMRS port is used for another purpose) and cannot be used for data information transmission, the network device determines that none of the resources corresponding to all the DMRS ports of the network device is not used to carry data information, that is, the second resource that is used to carry the second data information in the second time segment and that is determined by the network device includes none of the resources corresponding to all the DMRS ports of the network device.

It should be noted that the second data information in this embodiment is information about uplink transmission communication between a terminal device and the network device. In addition, for a specific definition of the second time segment in this embodiment, refer to the description in step S501 in the embodiment shown in FIG. 5. Details are not described herein.

S702. The network device sends indication information of the second resource to the terminal device.

When the network device determines a bearer that can be used to receive the second data information to be sent by the terminal device in the second time segment, that is, the second resource used to carry the second data information, the network device sends the indication information of the second resource to the terminal device. In this way, the terminal device can accordingly determine the second resource used to carry the to-be-sent second data information, so as to send the second data information on the corresponding resource.

In an example, the indication information of the second resource includes information used to indicate that the second resource includes none of the resources corresponding to all the DMRS ports of the network device. In another example, the indication information of the second resource includes information used to indicate an index of a symbol included in the second resource. For a specific meaning of the indication information of the second resource, refer to the description in step S502 in the embodiment shown in FIG. 5. Details are not described herein.

In addition, in an implementation, the network device may send the indication information of the second resource to the terminal device by using UE-specific signaling or cell-specific/common signaling. In another implementation, the network device sends the indication information of the second resource to the terminal device in a dynamic notification manner of using a PDCCH to carry the indication information of the second resource.

S703. The terminal device receives the indication information of the second resource from the network device.

Optionally, after the network device sends the indication information of the second resource to the terminal device, the terminal device receives the indication information of the second resource in a receiving manner agreed with the network device. For a specific receiving manner of the terminal device, refer to the description in step S503. Details are not described herein.

S704. The terminal device determines, based on the indication information of the second resource, the second resource used to carry the second data information in the second time segment.

The second resource includes none of the resources corresponding to all the DMRS ports of the network device.

In this embodiment, because the second resource that is used to carry the second data information in the second time segment and that is determined by the network device in step S701 includes none of the resources corresponding to all the DMRS ports of the network device, the terminal device can determine, by parsing the received indication information of the second resource, the second resource used to carry the second data information in the second time segment, and determine that the second resource includes none of the resources corresponding to all the DMRS ports of the network device.

S705. The terminal device sends the second data information to the network device by using the second resource to carry the second data information.

In uplink transmission between the terminal device and the network device, after the terminal device and the network device determine, by using the indication information of the second resource, the second resource used to carry the second data information, the terminal device can use the second resource to carry the second data information, so as to send the second data information to the network device.

S706. The network device receives, from the terminal device, the second data information carried on the second resource.

The network device listens to, based on the second resource that is determined in step S701 and that is used to carry the second data information, data transmission on the second resource, and receives the second data information at a corresponding location of the second resource. In this way, uplink transmission between the network device and the terminal device is implemented.

According to the communication method provided in this embodiment of this application, the network device first determines the second resource used to carry the second data information in the second time segment. The second resource includes none of the resources corresponding to all the DMRS ports of the network device. The network device then sends the indication information of the second resource to the terminal device. Correspondingly, the terminal device determines, based on the received indication information of the second resource, the second resource used to carry the second data information in the second time segment, and then the terminal device sends the second data information to the network device by using the second resource to carry the second data information. Then, the network device may receive, from the terminal device, the second data information carried on the second resource. In this way, when none of the resources corresponding to all the DMRS ports of the network device can be used to carry the second data information to be sent by the terminal device to the network device, the network device determines the second resource used to carry the second data information, and notifies the terminal device of the indication information, so that the terminal device may transmit the second data information on the corresponding second resource. Uplink information transmission between the network device and the terminal device is also implemented.

Figure 8:
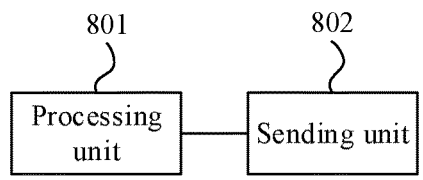
FIG. 8 is a schematic structural diagram of a network device according to an embodiment of this application.

FIG. 8 is a schematic structural diagram of a network device according to an embodiment of this application. As shown in FIG. 8, the network device in this embodiment may include a processing unit 801 and a sending unit 802.

The processing unit 801 is configured to: determine that a resource corresponding to at least one DMRS port of a plurality of DMRS ports of the network device is not used to transmit a DMRS in a first time segment; and determine a first resource used to carry, in the first time segment, first data information to be sent to a terminal device.

In this embodiment, the at least one DMRS port includes a first DMRS port, and correspondingly the first resource includes a resource corresponding to the first DMRS port.

The sending unit 802 is configured to: send indication information of the first resource to the terminal device; and send the first data information to the terminal device by using the first resource to carry the first data information.

Further, in this embodiment, the processing unit 801 is configured to determine a second resource used to carry, in a second time segment, second data information to be sent to the terminal device, where the second resource includes none of resources corresponding to all DMRS ports of the network device.

The sending unit 802 is further configured to: send indication information of the second resource to the terminal device; and send the second data information to the terminal device by using the second resource to carry the second data information.

In an example, the indication information of the second resource includes information used to indicate that the second resource includes none of the resources corresponding to all the DMRS ports of the network device.

In another example, the indication information of the second resource includes information used to indicate an index of a symbol included in the second resource.

In an embodiment, the sending unit 802 is further configured to send the indication information of the second resource to the terminal device by using UE-specific signaling or cell-specific/common signaling. Alternatively, the sending unit 802 is further configured to send the indication information of the second resource to the terminal device by using a PDCCH to carry the indication information of the second resource.

Optionally, the indication information of the first resource includes information used to indicate the resource corresponding to the first DMRS port.

Optionally, the information about the resource corresponding to the first DMRS port includes a port number of the first DMRS port or an index of the resource corresponding to the first DMRS port.

Further, the indication information of the first resource includes indication information of a third resource other than the resource corresponding to the first DMRS port in the first resource.

Optionally, the indication information of the third resource includes information used to indicate an index of a symbol included in the third resource.

In this embodiment, the sending unit 802 is further configured to send the indication information of the first resource to the terminal device by using UE-specific signaling or cell-specific/common signaling. Alternatively, the sending unit 802 is further configured to send the indication information of the first resource to the terminal device by using a PDCCH to carry the indication information of the first resource.

The network device in this embodiment may be configured to perform the implementation solutions of the network devices in the method embodiments shown in FIG. 4 and FIG. 5. Specific implementation manners and technical effects are similar, and details are not described herein.

Figure 9:
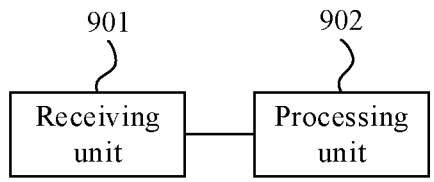
FIG. 9 is a schematic structural diagram of a terminal device according to an embodiment of this application.

FIG. 9 is a schematic structural diagram of a terminal device according to an embodiment of this application. As shown in FIG. 9, the terminal device in this embodiment may include a receiving unit 901 and a processing unit 902.

The receiving unit 901 is configured to receive indication information of a first resource from a network device.

The processing unit 902 is configured to determine, based on the indication information of the first resource, the first resource that is used by the network device to carry first data information in a first time segment.

The first resource includes a resource corresponding to a first DMRS port, the first DMRS port is one of at least one DMRS port of a plurality of DMRS ports of the network device, and a resource corresponding to the at least one DMRS port is not used to transmit a DMRS.

The receiving unit 901 is further configured to receive, from the network device, the first data information carried on the first resource.

Further, in this embodiment, the receiving unit 901 is configured to receive indication information of a second resource from the network device.

The processing unit 902 is further configured to determine, based on the indication information of the second resource, the second resource that is used by the network device to carry second data information in a second time segment, where the second resource includes none of resources corresponding to all DMRS ports of the network device.

Correspondingly, the receiving unit 901 is further configured to receive, from the network device, the second data information carried on the second resource.

Optionally, the indication information of the second resource includes information indicating that the second resource includes none of the resource corresponding to the DMRS port.

Optionally, the indication information of the second resource includes information used to indicate an index of a symbol included in the second resource.

In this embodiment, the receiving unit 901 is further configured to receive the indication information of the second resource from the network device by using UE-specific signaling or cell-specific/common signaling. Alternatively, the receiving unit 901 is further configured to receive, from the network device, the indication information of the second resource that is carried on a PDCCH.

Optionally, the indication information of the first resource includes information used to indicate the resource corresponding to the first DMRS port.

Optionally, the information about the resource corresponding to the first DMRS port includes a port number of the first DMRS port or an index of the resource corresponding to the first DMRS port.

Optionally, the indication information of the first resource includes indication information of a third resource other than the resource corresponding to the first DMRS port in the first resource.

Optionally, the indication information of the third resource includes information used to indicate an index of a symbol included in the third resource.

In this embodiment, the receiving unit 901 is further configured to receive the indication information of the first resource from the network device by using UE-specific signaling or cell-specific/common signaling. Alternatively, the receiving unit 901 is further configured to receive, from the network device, the indication information of the first resource that is carried on a PDCCH.

The terminal device in this embodiment may be configured to perform the implementation solutions of the terminal devices in the method embodiments shown in FIG. 4 and FIG. 5. Specific implementation manners and technical effects are similar, and details are not described herein.

Figure 10:
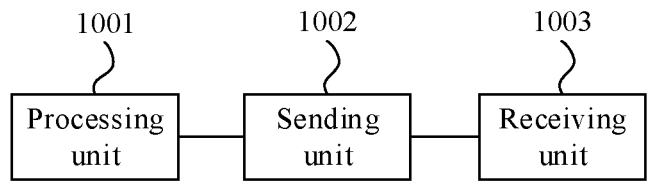
FIG. 10 is a schematic structural diagram of another network device according to an embodiment of this application.

FIG. 10 is a schematic structural diagram of another network device according to an embodiment of this application. As shown in FIG. 10, the network device in this embodiment may include a processing unit 1001, a sending unit 1002, and a receiving unit 1003.

The processing unit 1001 is configured to: determine that a resource corresponding to at least one DMRS port of a plurality of DMRS ports of the network device is not used to transmit a DMRS in a first time segment; and determine a first resource used to carry first data information in the first time segment.

The at least one DMRS port includes a first DMRS port, and correspondingly the first resource includes a resource corresponding to the first DMRS port.

The sending unit 1002 is configured to send indication information of the first resource to a terminal device.

The receiving unit 1003 is configured to receive, from the network device, the first data information carried on the first resource.

Further, in this embodiment, the processing unit 1001 is configured to determine a second resource used to carry second data information in a second time segment. The second resource includes none of resources corresponding to all DMRS ports of the network device.

The sending unit 1002 is further configured to send indication information of the second resource to the terminal device.

The receiving unit 1003 is further configured to receive, from the terminal device, the second data information carried on the second resource.

In an example, the indication information of the second resource includes information used to indicate that the second resource includes none of the resources corresponding to all the DMRS ports of the network device.

In another example, the indication information of the second resource includes information used to indicate an index of a symbol included in the second resource.

In an embodiment, the sending unit 1002 is further configured to send the indication information of the second resource to the terminal device by using UE-specific signaling or cell-specific/common signaling. Alternatively, the sending unit 1002 is further configured to send the indication information of the second resource to the terminal device by using a PDCCH to carry the indication information of the second resource.

Optionally, the indication information of the first resource includes information used to indicate the resource corresponding to the first DMRS port.

Optionally, the information about the resource corresponding to the first DMRS port includes a port number of the first DMRS port or an index of the resource corresponding to the first DMRS port.

Further, the indication information of the first resource includes indication information of a third resource other than the resource corresponding to the first DMRS port in the first resource.

Optionally, the indication information of the third resource includes information used to indicate an index of a symbol included in the third resource.

In this embodiment, the sending unit 1002 is further configured to send the indication information of the first resource to the terminal device by using UE-specific signaling or cell-specific/common signaling. Alternatively, the sending unit 1002 is further configured to send the indication information of the first resource to the terminal device by using a PDCCH to carry the indication information of the first resource.

The network device in this embodiment may be configured to perform the implementation solutions of the network devices in the method embodiments shown in FIG. 6 and FIG. 7. Specific implementation manners and technical effects are similar, and details are not described herein.

Figure 11:
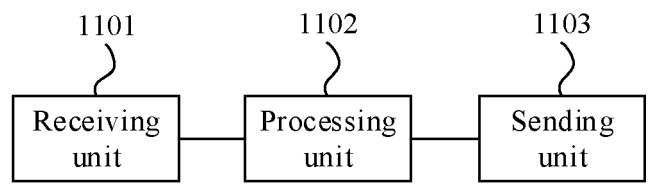
FIG. 11 is a schematic structural diagram of another terminal device according to an embodiment of this application.

FIG. 11 is a schematic structural diagram of another terminal device according to an embodiment of this application. As shown in FIG. 11, the terminal device in this embodiment may include a receiving unit 1101, a processing unit 1102, and a sending unit 1103.

The receiving unit 1101 is configured to receive indication information of a first resource from a network device.

The processing unit 1102 is configured to determine, based on the indication information of the first resource, the first resource used to carry first data information in a first time segment.

The first resource includes a resource corresponding to a first DMRS port, the first DMRS port is one of at least one DMRS port of a plurality of DMRS ports of the network device, and a resource corresponding to the at least one DMRS port is not used to transmit a DMRS.

The sending unit 1103 is configured to send the first data information to the network device by using the first resource to carry the first data information.

Further, in this embodiment, the receiving unit 1101 is configured to receive indication information of a second resource from the network device.

Correspondingly, the processing unit 1102 is further configured to determine, based on the indication information of the second resource, the second resource used to carry second data information in a second time segment, where the second resource includes none of resources corresponding to all DMRS ports of the network device.

The sending unit 1103 is further configured to send the second data information to the network device by using the second resource to carry the second data information.

Optionally, the indication information of the second resource includes information indicating that the second resource includes none of the resource corresponding to the DMRS port.

Optionally, the indication information of the second resource includes information used to indicate an index of a symbol included in the second resource.

In this embodiment, the receiving unit 1101 is further configured to receive the indication information of the second resource from the network device by using UE-specific signaling or cell-specific/common signaling. Alternatively, the receiving unit 1101 is further configured to receive, from the network device, the indication information of the second resource that is carried on a PDCCH.

Optionally, the indication information of the first resource includes information used to indicate the resource corresponding to the first DMRS port.

Optionally, the information about the resource corresponding to the first DMRS port includes a port number of the first DMRS port or an index of the resource corresponding to the first DMRS port.

Optionally, the indication information of the first resource includes indication information of a third resource other than the resource corresponding to the first DMRS port in the first resource.

Optionally, the indication information of the third resource includes information used to indicate an index of a symbol included in the third resource.

In this embodiment, the receiving unit 1101 is further configured to receive the indication information of the first resource from the network device by using UE-specific signaling or cell-specific/common signaling. Alternatively, the receiving unit 1101 is further configured to receive, from the network device, the indication information of the first resource that is carried on a PDCCH.

The terminal device in this embodiment may be configured to perform the implementation solutions of the terminal devices in the method embodiments shown in FIG. 6 and FIG. 7. Specific implementation manners and technical effects are similar, and details are not described herein.

It should be noted that unit division of the foregoing devices (the network device and the terminal device) is merely logical function division. During actual implementation, the foregoing units may be all or partially integrated into one physical entity, or may be physically separated. Moreover, all of these units may be implemented by software invoked by a processing element, or may be all implemented by hardware; or some units are implemented by software invoked by a processing element, and some units are implemented by hardware. For example, the processing unit may be a separate processing element, or may be integrated into a chip of the foregoing devices for implementation. In addition, the processing unit may be stored in a memory of the foregoing devices in a form of program code, and a processing element of the foregoing device invokes the program code and performs a function of the foregoing processing unit. Other units are implemented in a similar manner. In addition, these units are all or partially integrated, or may be implemented separately. The processing element herein may be an integrated circuit and has a signal processing capability. In an implementation process, steps in the foregoing methods or the foregoing units can be implemented by using a hardware integrated logical circuit in the processing element, or by using instructions in a form of software.

For example, these units may be configured as one or more integrated circuits implementing the foregoing methods, for example, one or more application-specific integrated circuits (application-specific integrated circuit, ASIC), one or more digital signal processors (digital signal processor, DSP), or one or more field programmable gate arrays (field programmable gate array, FPGA). For another example, when a unit is implemented by invoking program code by a processing element, the processing element may be a general-purpose processor, for example, a central processing unit (Central Processing Unit, CPU) or another processor that can invoke the program code. For another example, these units may be integrated together and implemented in a system-on-a-chip (system-on-a-chip, SOC) form.

All or some of the foregoing embodiments may be implemented by means of software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, DVD), a semiconductor medium (for example, a solid state disk (SSD)), or the like.

Figure 12:
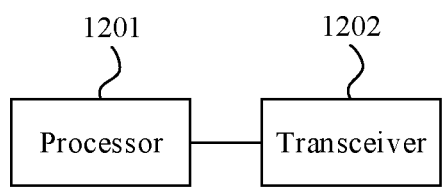
FIG. 12 is a schematic structural diagram of still another network device according to an embodiment of this application.

FIG. 12 is a schematic structural diagram of still another network device according to an embodiment of this application. The network device provided in this embodiment includes a processor 1201 and a transceiver 1202. Optionally, the network device may further include a memory, where the memory is configured to store an execution instruction of the processor 1201. Optionally, the transceiver 1202 may be implemented by a transmitter and a receiver. The transmitter and the receiver each have an independent function, and each may be implemented in an antenna form and the like. This is not limited in this embodiment of this application. The processor 1201 and the transceiver 1202 are configured to run a computer execution instruction, so that the network device performs the steps of the network device applied in the communication method.

Specifically, in FIG. 8, the processing unit 801 is corresponding to the processor 1201, the sending unit 802 is corresponding to the transceiver 1202, and so on.

Figure 13:
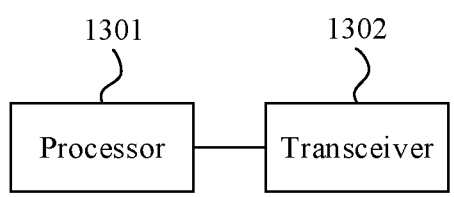
FIG. 13 is a schematic structural diagram of still another terminal device according to an embodiment of this application.

FIG. 13 is a schematic structural diagram of still another terminal device according to an embodiment of this application. The terminal device provided in this embodiment includes a processor 1301 and a transceiver 1302. Optionally, the terminal device may further include a memory, where the memory is configured to store an execution instruction of the processor 1301. Optionally, the transceiver 1302 may be implemented by a transmitter and a receiver. The transmitter and the receiver each have an independent function, and each may be implemented in an antenna form and the like. This is not limited in this embodiment of this application. The processor 1301 and the transceiver 1302 are configured to run a computer execution instruction, so that the terminal device performs the steps of the terminal device applied in the communication method.

Specifically, in FIG. 9, the receiving unit 901 is corresponding to the transceiver 1302, the processing unit 902 is corresponding to the processor 1301, and so on.

Figure 14:
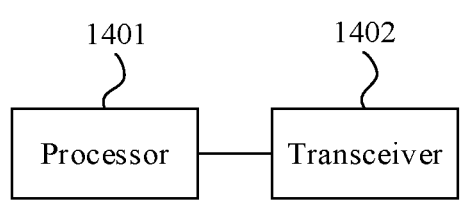
FIG. 14 is a schematic structural diagram of yet another network device according to an embodiment of this application.

FIG. 14 is a schematic structural diagram of yet another network device according to an embodiment of this application. The network device provided in this embodiment includes a processor 1401 and a transceiver 1402. Optionally, the network device may further include a memory, where the memory is configured to store an execution instruction of the processor 1401. Optionally, the transceiver 1402 may be implemented by a transmitter and a receiver. The transmitter and the receiver each have an independent function, and each may be implemented in an antenna form and the like. This is not limited in this embodiment of this application. The processor 1401 and the transceiver 1402 are configured to run a computer execution instruction, so that the network device performs the steps of the network device applied in the communication method.

Specifically, in FIG. 10, the processing unit 1001 is corresponding to the processor 1401, the sending unit 1002 and the receiving unit 1003 are corresponding to the transceiver 1402, and so on.

Figure 15:
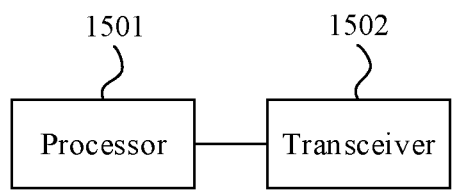
FIG. 15 is a schematic structural diagram of yet another terminal device according to an embodiment of this application.

FIG. 15 is a schematic structural diagram of yet another terminal device according to an embodiment of this application. The terminal device provided in this embodiment includes a processor 1501 and a transceiver 1502. Optionally, the terminal device may further include a memory, where the memory is configured to store an execution instruction of the processor 1501. Optionally, the transceiver 1502 may be implemented by a transmitter and a receiver. The transmitter and the receiver each have an independent function, and each may be implemented in an antenna form and the like. This is not limited in this embodiment of this application. The processor 1501 and the transceiver 1502 are configured to run a computer execution instruction, so that the terminal device performs the steps of the terminal device applied in the communication method.

Specifically, in FIG. 11, the receiving unit 1101 and the sending unit 1103 are corresponding to the transceiver 1502, the processing unit 1102 is corresponding to the processor 1501, and so on.

Figure 16:
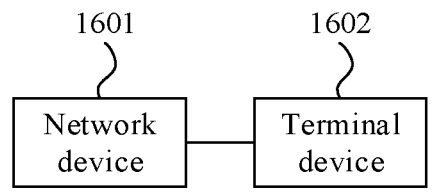
FIG. 16 is a schematic structural diagram of a communications system according to an embodiment of this application.

Further, FIG. 16 is a schematic structural diagram of a communications system according to an embodiment of this application. As shown in FIG. 16, the communication system provided in this embodiment includes a network device 1601 and a terminal device 1602.

The network device 1601 is the network device in the embodiment shown in FIG. 8 or the network device in the embodiment shown in FIG. 12, and the terminal device 1602 is the terminal device in the embodiment shown in FIG. 9 or the terminal device in the embodiment shown in FIG. 13. For specific implementation solutions and beneficial effects of the network device and the terminal device, refer to the descriptions in FIG. 8 and FIG. 9 or FIG. 12 and FIG. 13. Details are not described herein.

Alternatively, the network device 1601 is the network device in the embodiment shown in FIG. 10 or the network device in the embodiment shown in FIG. 14, and the terminal device 1602 is the terminal device in the embodiment shown in FIG. 11 or the terminal device in the embodiment shown in FIG. 15. For specific implementation solutions and beneficial effects of the network device and the terminal device, refer to the descriptions in FIG. 10 and FIG. 11 or FIG. 14 and FIG. 15. Details are not described herein.

What is claimed is:

1. A communication method, comprising:
    determining, by a network device, a first resource for carrying data in a first time segment, wherein the first resource is corresponding to a first demodulation reference signal (DMRS) port, the first resource is not used to transmit a DMRS, and the first DMRS port is in a plurality of DMRS ports configured by the network device;
    sending, by the network device, indication information to a terminal device, wherein the indication information indicates to the terminal device the first resource for carrying data, and the indication information includes an index of a resource corresponding to a second DMRS port, the resource corresponding to the second DMRS port is not used to carry data, the second DMRS port is in the plurality of DMRS ports and different from the first DMRS port;
    sending, by the network device in the first time segment, data to the terminal device via the first resource, or receiving, by the network device in the first time segment from the terminal device, data via the first resources;
    determining, by the network device, a second resource in a second time segment, wherein the second resource is different from resources corresponding to all DMRS ports of the network device;
    sending, by the network device, indication information of the second resource to the terminal device; and
    sending, by the network device in the second time segment, second data to the terminal device via the second resource, or receiving, by the network device from the terminal device in the second time segment, second data via the second resource.

2. The method according to claim 1, wherein the indication information of the second resource comprises information indicates that the second resource is different from the resources corresponding to all the DMRS ports of the network device.

3. The method according to claim 1, wherein the indication information of the first resource is carried in a physical downlink control channel.

4. A network device, comprising:
    a processor, configured to determine a first resource for carrying data in a first time segment, wherein the first resource is corresponding to a first demodulation reference signal (DMRS) port, the first resource is not used to transmit a DMRS, and the first DMRS port is in a plurality of DMRS ports configured by the network device; and
    a transceiver, configured to send indication information to a terminal device, wherein the indication information indicates to the terminal device the first resource for carrying data, and the indication information includes an index of a resource corresponding to a second DMRS port, the resource corresponding to the second DMRS port is not used to carry data, the second DMRS port is in the plurality of DMRS ports and different from the first DMRS port; and send data in the first time segment to the terminal device via the first resource, or receive data in the first time segment from the terminal device via the first resource,
    wherein the processor is further configured to determine a second resource in a second time segment,
    wherein the second resource is different from resources corresponding to all DMRS ports of the network device, and
    the receiver is further configured to sending, by the network device, indication information of the second resource to the terminal device; and send in the second time segment second data to the terminal device via the second resource, or receive in the second time segment second data from the terminal device via the second resource.

5. The network device according to claim 4, wherein the indication information of the second resource comprises information indicates that the second resource is different from the resources corresponding to all the DMRS ports of the network device.

6. The network device according to claim 4, wherein the indication information of the first resource is carried in a physical downlink control channel.

7. A communication device, comprising:
    a processor, a transceiver, and a memory unit storing program instructions;
    wherein when executed by the processor, the program instructions enable the terminal device to perform the following steps:
    determining a first resource for carrying data in a first time segment, wherein the first resource is corresponding to a first demodulation reference signal (DMRS) port, the first resource is not used to transmit a DMRS, and the first DMRS port is in a plurality of DMRS ports configured by the network device;
    sending indication information to a terminal device, wherein the indication information indicates to the terminal device the first resource for carrying data, and the indication information includes an index of a resource corresponding to a second DMRS port, the resource corresponding to the second DMRS port is not used to carry data, the second DMRS port is in the plurality of DMRS ports and different from the first DMRS port;
    sending data in the first time segment to the terminal device via the first resource, or receiving data in the first time segment from the terminal device via the first resources;
    determining a second resource in a second time segment, wherein the second resource is different from resources corresponding to all DMRS ports of the network device;
    sending indication information of the second resource to the terminal device; and
    sending second data in the second time segment to the terminal device via the second resource, or receiving second data in the second time segment from the terminal device via the second resource.

8. The communication device according to claim 7, wherein the indication information of the second resource comprises information indicates that the second resource is different from the resources corresponding to all the DMRS ports of the network device.

9. The communication device according to claim 7, wherein the indication information of the first resource is carried in a physical downlink control channel.

10. A non-transitory storage medium storing computer program codes which, when executed by a processor of a communication device, cause the communication device to perform operations of:

determining a first resource for carrying data in a first time segment, wherein the first resource is corresponding to a first demodulation reference signal (DMRS) port, the first resource is not used to transmit a DMRS, and the first DMRS port is in a plurality of DMRS ports configured by the network device;

sending indication information to a terminal device, wherein the indication information indicates to the terminal device the first resource for carrying data, and the indication information includes an index of a resource corresponding to a second DMRS port, the resource corresponding to the second DMRS port is not used to carry data, the second DMRS port is in the plurality of DMRS ports and different from the first DMRS port;

sending data in the first time segment to the terminal device via the first resource, or receiving data in the first time segment from the terminal device via the first resources;

determining a second resource in a second time segment, wherein the second resource is different from resources corresponding to all DMRS ports of the network device;

sending indication information of the second resource to the terminal device; and sending second data in the second time segment to the terminal device via the second resource, or receiving second data in the second time segment from the terminal device via the second resource.

11. The non-transitory storage medium according to claim 10, wherein the indication information of the second resource comprises information indicates that the second resource is different from the resources corresponding to all the DMRS ports of the network device.

12. The non-transitory storage medium according to claim 10, wherein the indication information of the first resource is carried in a physical downlink control channel.

* * * * *